United States Patent [19]

Inamori et al.

[11] Patent Number: 5,136,505

[45] Date of Patent: Aug. 4, 1992

[54] ELECTRONIC TRANSLATOR APPARATUS FOR TRANSLATING WORDS OR PHRASES AND AUXILIARY INFORMATION RELATED TO THE WORDS OR PHRASES

[75] Inventors: Yoshimitsu Inamori; Hiroshi Takada, both of Nara; Masao Okumura, Yamatokoriyama; Toshiro Oba; Hiroshi Nittaya, both of Ikoma; Shuji Kaya, Yamatokoriyama; Fumiaki Kawawaki, Yamatokoriyama; Tetsuya Inoue, Yamatokoriyama; Michiaki Kuno, Yamatokoriyama; Hisao Kunita, Naga, all of Japan

[73] Assignee: Sharp Kabushiki Kaisha, Osaka, Japan

[21] Appl. No.: 389,281

[22] Filed: Aug. 3, 1989

[30] Foreign Application Priority Data

| Aug. 3, 1988 | [JP] | Japan | 63-102814[U] |
| Aug. 3, 1988 | [JP] | Japan | 63-194023 |
| Aug. 3, 1988 | [JP] | Japan | 63-194024 |
| Aug. 4, 1988 | [JP] | Japan | 63-195585 |
| Aug. 4, 1988 | [JP] | Japan | 63-195586 |
| Aug. 4, 1988 | [JP] | Japan | 63-195587 |
| Aug. 4, 1988 | [JP] | Japan | 63-196390 |

[51] Int. Cl.$^5$ .................... G06F 15/38; G06G 7/60
[52] U.S. Cl. .................... 364/419; 364/920.4
[58] Field of Search ............... 364/419, 920.4

[56] References Cited

U.S. PATENT DOCUMENTS

| 4,393,462 | 7/1983 | Tanimoto et al. | 364/900 |
| 4,584,667 | 4/1986 | Hashimoto et al. | 364/419 X |
| 4,593,356 | 6/1986 | Hashimoto et al. | 364/419 |
| 4,733,368 | 3/1988 | Morimoto et al. | 364/419 X |
| 4,774,596 | 9/1988 | Hashimoto | 364/419 X |

FOREIGN PATENT DOCUMENTS 0049564 3/1987 Japan.
0203267 9/1987 Japan.

OTHER PUBLICATIONS

The English Abstract of the Published Japanese Patent Application No. 56-147269.
The English Abstract of the Published Japanese Patent Application No. 56-147268.
The English Abstract of the Published Japanese Patent Application No. 63-310062.
The English Abstract of the Published Japanese Patent Application No. 63-298562.
The English Abstract of the Published Japanese Patent Application No. 58-217080.

Primary Examiner—Dale M. Shaw
Assistant Examiner—Laura Brutman

[57] ABSTRACT

In an electronic translator apparatus, synonymous phrases (title data) and sentences in plural languages are stored in correspondence to each other. These phrases or sentences are read out and translated. This electronic translator apparatus stores the title data as a basic phrase and the explanatory data relating to the title data, thereby allowing a wide range of translation. The title data can be translated into plural languages which are displayed simultaneously. The title data and corresponding sentences are separately stored, thereby increasing the number of sentences that can be translated. The display method is varied depending on the necessity. If the sentence to be translated is long, part of the original sentence during displaying is ommitted and the translated sentence is displayed in whole. When translating into English, an article may be added or a plural form may be expressed so as to translate properly. When translating into Korean, accurate translation corresponding to the presence or absence of PACHIM may be realized.

1 Claim, 31 Drawing Sheets

キムチを見せて下さい。　　김치(를) 보여 주시요.
　　　　　　　　　　　　　　↑
　　　　　　　　　　　　　WITHOUT PACHIM

FIG. 3 (3) PRIOR ART

仮面を見せて下さい。　　가면 (을) 보여 주시요.
　　　　　　　　　　　　↑
　　　　　　　　　　　　WITH PACHIM

FIG. 7(1)

INDEX ID1

MINOR CATEGORY START ADDRESS

| 3 BYTES | JAPANESE MINOR CATEGORY (1-1) START ADDRESS |
| --- | --- |
|  | JAPANESE MINOR CATEGORY (1-2) START ADDRESS |
|  | ⋮ |
|  | JAPANESE MINOR CATEGORY (7-N) START ADDRESS |

| 3 BYTES | ENGLISH MINOR CATEGORY (1-1) START ADDRESS |
| --- | --- |
|  | ⋮ |
|  | ENGLISH MINOR CATEGORY (7-N) START ADDRESS |

| 3 BYTES | KOREAN MINOR CATEGORY (1-1) START ADDRESS |
| --- | --- |
|  | ⋮ |
|  | KOREAN MINOR CATEGORY (7-N) START ADDRESS |

FIG. 8(1)

| | | BEGINNING ADDRESS | | |
|---|---|---|---|---|
| WORD | JAPANESE | ◯ | ◯ | ◯ |
| | ENGLISH | ◯ | ◯ | ◯ |
| | KOREAN | ◯ | ◯ | ◯ |
| CONVERSATION | JAPANESE | ◯ | ◯ | ◯ |
| | ENGLISH | ◯ | ◯ | ◯ |
| | KOREAN | ◯ | ◯ | ◯ |
| INFORMATION | JAPANESE | ◯ | ◯ | ◯ ←a |
| | ENGLISH | ◯ | ◯ | ◯ ←b |
| | KOREAN | ◯ | ◯ | ◯ ←c |
| EXAMPLE SENTENCE | JAPANESE | ◯ | ◯ | ◯ |
| | ENGLISH | ◯ | ◯ | ◯ |
| | KOREAN | ◯ | ◯ | ◯ |

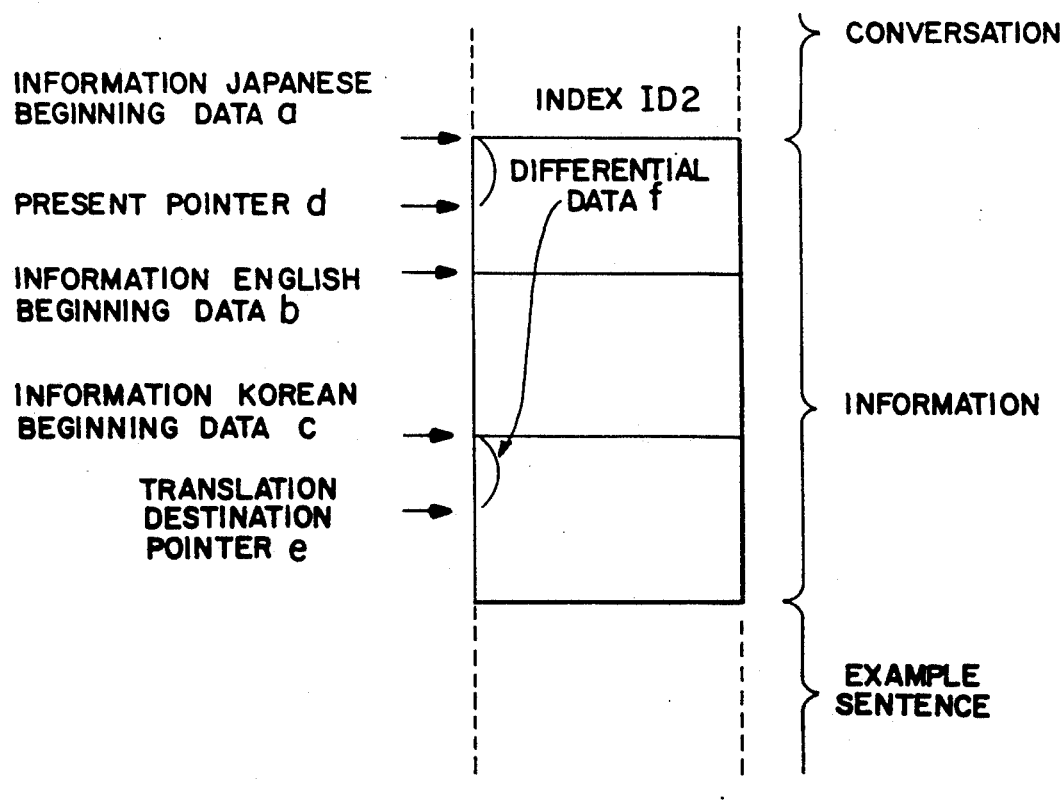
FIG. 8 (2)

FIG. 12

| OPERATION | DISPLAY | |
|---|---|---|
| GUIDE | 日 ▶ 英　ガイド | (1) |
| SPORT (CATEGORY KEY) | 開会式 | (2) |
| TRANSLATION | OPENING CEREMONY 英 | (3) |
| INFORMATION | 9/17 (土) | (4) |
| TRANSLATION | SEP. 17 (SAT) 英 | (5) |
| FUNCTION　TRANSLATION | 9/17 (토) 韓 | (6) |

FIG. 13

| OPERATION | DISPLAY | |
|---|---|---|
| GUIDE | 日 ▶ 英　ガイド | (1) |
| HOTEL　INFORMATION | ☎ (02) 345 1234 ↓ | (2) |
| TRANSLATION | ☎ (02) 英　345 1234 ↓ | (3) |
| VEHICLE | タクシー | (4) |
| INFORMATION | 以下の3種類 ＜一般タクシー＞ ↓ | (5) |
| TRANSLATION | ※ ※ ※ ※ ※ 英 | (6) (TEMPORARY DISPLAY) |
|  | 以下の3種類 ＜一般タクシー＞ ↓ | (7) |

FIG. 15 (1) 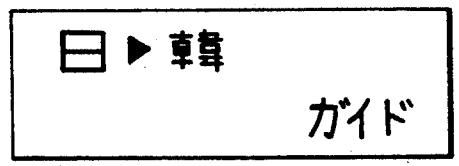
FIG. 15 (2) 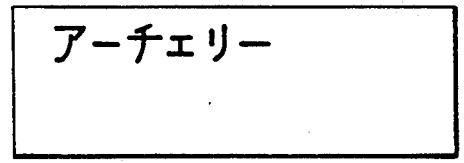
FIG. 15 (3) 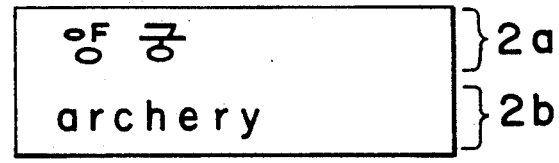
FIG. 15 (4) 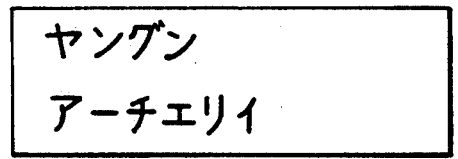

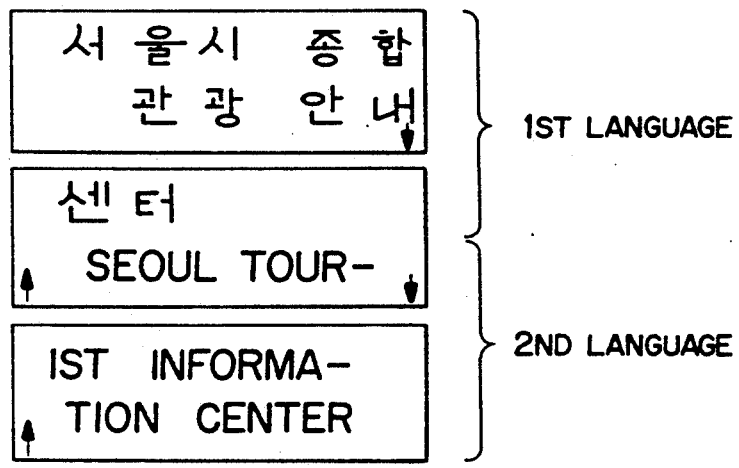
FIG. 17(1), FIG. 17(2), FIG. 17(3) — 1ST LANGUAGE / 2ND LANGUAGE
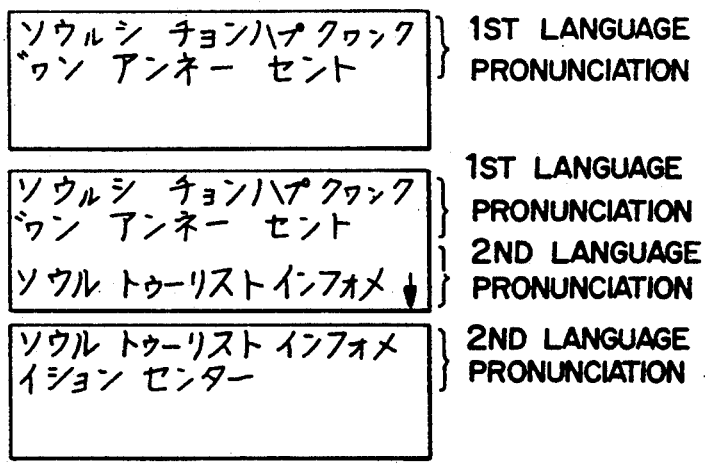
FIG. 18(1), FIG. 18(2), FIG. 18(3) — 1ST LANGUAGE PRONUNCIATION / 2ND LANGUAGE PRONUNCIATION

남 대 문
NAMDAEMUN

ナムデームン

FIG. 21 (1) 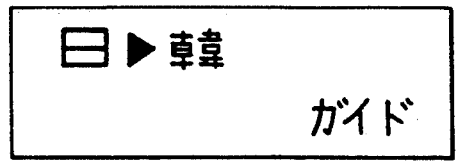
FIG. 21 (2) 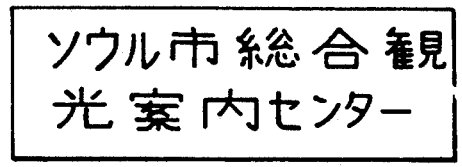
FIG. 21 (3) 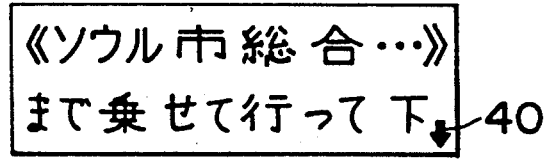
FIG. 21 (4) 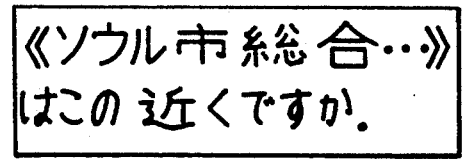
FIG. 21 (5) 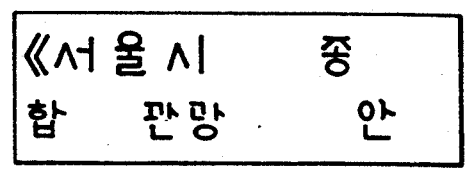

FIG. 26

| OPERATION | DISPLAY |
|---|---|
| (1) GUIDE | 日 ▶ 韓<br>ガイド |
| (2) RESTAURANT AND FORWARD FEED (CATEGORY KEY) | 韓定食 |
| (3) EXAMPLE SENTENCE | 《韓定食》を1人前下さい。 |
| (4) FORWARD FEED | 《韓定食》を2人前下さい。 |
| (5) TRANSLATION | 《한정식》이인분 주세요 ↓ |
| (6) PRONUNCIATION | 《ハンヂョンシク》イーインブンヂュセヨ。 |

FIG. 28

| OPERATION | DISPLAY | |
|---|---|---|
| GUIDE | 韓 ▶ 日<br>ガイド | (1) |
| SHOPPING, EXCHANGE AND FORWARD FEED (CATEGORY KEY) | 김치<br>KIMCHI | (2) |
| EXAMPLE SENTENCE | 《김치》를<br>보여 주세요 | (3) |
| PRONUNCIATION | 《キムチ》ルル ボヨ チュ<br>セヨ。 | (4) |
| SHOPPING, EXCHANGE AND FORWARD FEED (CATEGORY KEY) | 가면<br>MASK | (5) |
| EXAMPLE SENTENCE | 《가면》을<br>보여 주세요 | (6) |
| PRONUNCIATION | 《カミョ》ヌル ボヨ チュ<br>セヨ。 | (7) |

WITHOUT PACHIM

WITH PACHIM

FIG. 29 (1)
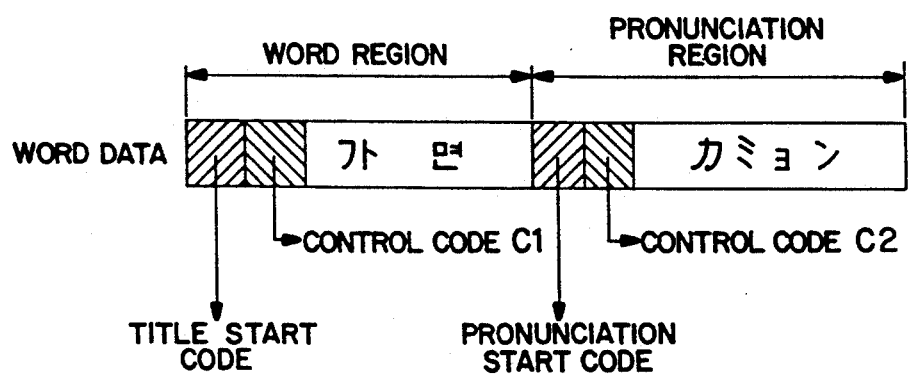
FIG. 29(2)
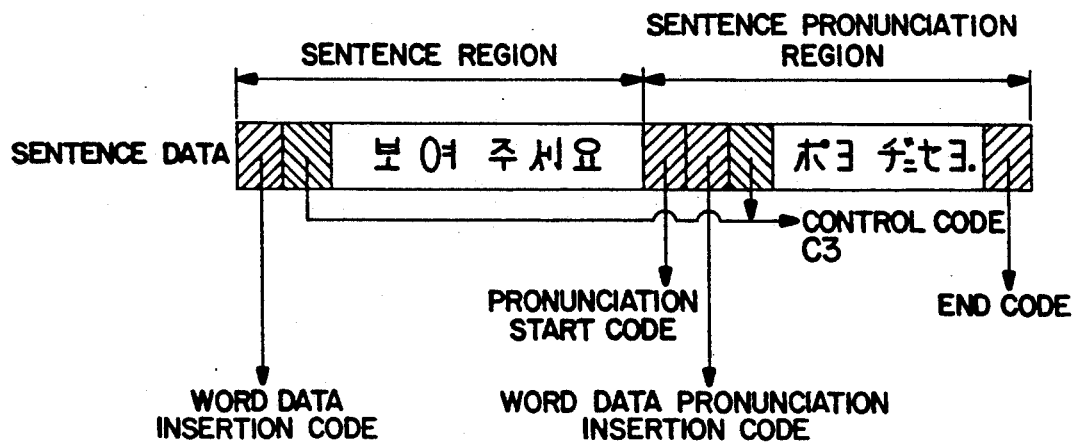

FIG. 31

| OPERATION | DISPLAY | |
|---|---|---|
| GUIDE | 英 ▶ 日<br>ガイド | (1) |
| EMERGENCY AND FORWARD FEED (CATEGORY KEY) | EMBASSY OF JAPAN | (2) |
| EXAMPLE SENTENCE | PLEASE CALL THE 《EMBASSY OF JAPAN》 FOR ME. | (3) |
| PRONUNCIATION | プリーズ コール ザ 《エンバシィ オブ ジャパン》 フォー ミー. | (4) |
| EMERGENCY AND FORWARD FEED (CATEGORY KEY) | AMERICAN EMBASSY | (5) |
| EXAMPLE SENTENCE | PLEASE CALL THE 《AMERICAN EMBASSY》 FOR ME. | (6) |
| PRONUNCIATION | プリーズ コール ジ 《アメリカン エンバシィ》 フォー ミー. | (7) |
| EMERGENCY AND FORWARD FEED (CATEGORY KEY) | BANK OF TOGYO | (8) |
| EXAMPLE SENTENCE | PLEASE CALL 《BANK OF TOGYO》 FOR ME. | (9) |
| PRONUNCIATION | プリーズ コール 《バンク オブ トーギョー》 フォー ミー. | (10) |

WITH "THE" PRONOUNCED "ザ" → (2)

WITH "THE" PRONOUNCED "ジ" → (5)

WITHOUT "THE" → (8)

ELECTRONIC TRANSLATOR APPARATUS FOR TRANSLATING WORDS OR PHRASES AND AUXILIARY INFORMATION RELATED TO THE WORDS OR PHRASES

BACKGROUND OF THE PRESENT INVENTION

1. Field of the Present Invention

The present invention relates to an electronic translator apparatus in which synonymous words or sentences of plural languages are correspondingly stored, and translation is executed by properly reading out these words or sentences.

2. Description of the Prior Art

In a conventional electronic translator apparatus, desired title data is read out from a language memory by the operation of a category key. The title data is translated, for example, from Japanese into English, by the operation of a translation key, and is displayed. More specifically, first a desired field (e.g. sport) is selected by a category key, then desired title data (e.g.開会式) is selected from the field, and it is translated and displayed in other language (e.g. opening ceremony) by the operation of a translation key.

In the conventional electronic translator apparatus, however, only the title data can be translated, and it The explanatory data accompanying the title data (for example, when the title data is the opening ceremony, the detailed data about the title data such as the date of opening and the time of opening) cannot be translated, and the contents of the translation are limited, making the conventional device poorly practicable.

In certain portable electronic translator apparati, it is possible to translate in three languages, such as Japanese, Korean and English. In such apparatus, for example, in the Japanese-Korean translation mode for translating from Japanese into Korean, first a desired word to be translated is selected by a key input operation. As a result, the desired Japanese word is displayed. Afterwards, by pressing the translation key, the corresponding Korean word is displayed. Similarly, in the Korean-English translation mode for translating from Korean into English, the Korean word selected by the key input operation can be translated into an English word by the similar key input operation.

In such translator apparatus, although the selected word can be translated into a desired language, the corresponding words of two languages cannot be displayed simultaneously without performing an additional translation operation. That is, if it is desired to compare a word of a specific language with a corresponding word in an other language, the addition translation operation was always necessary, and the operation was complicated In a portable small-sized electronic translator apparatus, a key input part and a display part are provided In such translator apparatus, a preliminarily stored word or sentence can be read out and displayed in the display part by the operation of the key input part, and synonymous words or sentences between desired languages can be translated.

The displayed part built in such translator apparatus is limited in the display capacity for one screen portion in order to reduce the size of the entire apparatus. Therefore, if a preliminarily stored sentence exceeds the display capacity of one screen, the whole sentence cannot be displayed at a time, and to read the whole sentence it is necessary to operate the key so as to scroll up the screen.

FIG. 1 is a diagram showing a display example in the prior art. As the words to be displayed in the display part, for example " ソウル市綜合観光案内センター " is selected, and the display becomes as shown in FIG. 1 (1). If a sentence starting with these words is selected " 《ソウル市綜合観光案内センター》まで案セて行ってください ", the display becomes as shown in FIG. 1 (2). At this time, of the words other than the subject words initially shown as the title data (enclosed by double acute brackets in the illustration), only " ま " is displayed, and it is impossible to predict the whole sentence from this display screen Therefore, the whole sentence cannot be read unless the screen is scrolled up to confirm the succeeding words of the sentence Meanwhile, in the example sentence composition operation by example sentence function capable of composing plural sentences relating to one a word corresponding to a noun, to search for a desired example sentence, sentences are fed and displayed sequentially one by one. However, when the display capacity of the example sentences is large, the key operation for scrolling up is frequent, and the retrieval time is longer.

In other electronic translator apparatus, a word in a specific language (e.g. Japanese) and a corresponding sentence are combined and stored as one conversational sentence, and the stored conversational sentence is displayed. The displayed conversational sentence is translated into a conversational sentence in other language (e.g. Korean) and displayed. For example, the following conversational sentences are stored and displayed.

Examples
1. 《航空会社》まで案セて行ってください.
2. 《航空会社》に電話をかけてください.
3. 《空港》まで案セて行ってください.

In this conventional electronic translator apparatus, as shown in the examples above, though the word (proper noun or common noun) is enclosed in double acute brackets in the conversational sentence, this word is combined with the other words, and stored in the memory as one conversational sentence Therefore, the same word or sentence must be stored in the memory in duplicate. In the case of the above examples " 航空会社 " and " 案セて行ってください " are stored twice, respectively. Accordingly, the variety of the data that can be stored is reduced, and the number of conversational sentences that can be displayed is reduced.

In other electronic translator apparatus, a conversational sentence of a specific language (e.g. Japanese) is translated into a conversational sentence and displayed in hankul, while the pronunciation of hankul is also displayed.

Hankul is phonetic symbols, consisting of 21 vowels and 19 consonants. When a word is followed by a postpositional word like the Japanese "を", "が", "は", "に", the word has a PACHIM or not, and hence its pronunciation differs.

This PACHIM is a third consonant (final verbal consonant) in a letter composed of consonant+vowel+-consonant as shown in FIG. 2. For example, seeing hankul corresponding to " ～を見せてください." shown in FIG. 3 (1) hankul corresponding to " を " is either " 를 " or " 을 ". As shown in FIG. 3 (2), " 를 " is used if there is no PACHIM in the final letter of the preceding word, and "을" is used if there is a PACHIM in the final letter of the preceding word as shown in FIG. 3 (3).

Thus, the next word differs depending on whether the final letter of the word has a PACHIM or not, and therefore its pronunciation varies, too. In the conventional electronic translator apparatus, however, it is not designed to vary the letter or pronunciation depending on whether the PACHIM is present or not, and hence the conversational sentence cannot be correctly expressed in the hankul.

In another electronic translator apparatus, the sentence in, for example, Japanese is translated into English and displayed.

In this electronic translator apparatus, when expressing an English word, it is displayed in a singular form, and a necessary article is not added or the word is not expressed in a plural form. Hence the sentence cannot be expressed correctly.

SUMMARY OF THE PRESENT INVENTION

It is hence a primary object of the present invention to present an electronic translator apparatus expanded in the content of translation and enhanced in the practicality.

It is once object of the present invention to present an electronic translator apparatus capable of enhancing the controllability when comparing and referring to the words corresponding to nouns in plural languages or related data.

It is a different object of the present invention to present an electronic translator apparatus capable of enhancing the controllability and function when expressing desired sentences or the like.

It is a further different object of the present invention to present an electronic translator apparatus increased in the variety of the data to be stored so that more conversational sentences may be expressed.

It is another object of the present invention to present an electronic translator apparatus capable or expressing the conversational sentences correctly in hankul by varying the succeeding word depending on whether the final letter of a preceding word has a PACHIM or not, and changing the pronunciation accordingly.

It is still another object of the present invention to present an electronic translator apparatus capable of expressing an English word by adding a proper article or in a plural form.

To achieve the above objects, the electronic translator apparatus of the present invention comprises a language memory for storing the title data and explanatory data relating to the title data, means for reading out desired title data by category key operation and reading out the explanatory data relating to the title data in response to specific key operation from the language memory, and means for translating the read-out explanatory data into another language in response to translation key operation.

Present invention also presents an electronic translator apparatus comprising means for storing mutually synonymous noun equivalent words of plural languages and related data correspondingly, and a display part for displaying desired characters in a selected language, in which the noun equivalent words or the related data are displayed in parallel in plural languages.

The present invention further presents an electronic translator apparatus comprising means for storing mutually synonymous noun equivalent words of plural languages correspondingly, and also storing the plural types of sentences using the noun equivalent words in each language correspondingly to each other, and a display part for displaying a desired sentence in a selected language, in which when displaying a sentence corresponding a noun equivalent word in one language, part of the noun equivalent word is omitted in display if the display capacity of the noun equivalent word is larger than a predetermined display capacity, and when the sentence is displayed as being translated into other language, all the noun equivalent words are displayed.

The present invention moreover presents an electronic translator apparatus for translating a conversational sentence displayed in the display means into a conversational sentence in other language and displaying in the display means, which further comprises means for storing the word data and sentence data separately, and means for composing conversational sentences by separately selecting the word data and sentence data stored in the storing means, and displaying the conversational sentence in the display means, thereby translating the conversational sentence composed by the conversational sentence composing means.

The present invention still more presents an electronic translator apparatus for displaying the conversational sentence translated in the hankul and the pronunciation of the conversational sentence in the display means, which comprises means for storing the data expressing the words in the hankul, first control code to show if the final letter of the word has a PACHIM or not, and the second control code for selecting the pronunciation of the letter succeeding that word by corresponding to each other, and also storing the data expressing the sentences in the hankul and the third control code for selecting the letter to be added before the sentence, and means for controlling for selecting, when displaying the sentence in succession to the word in the display means, the letter to be added between the word and the sentence on the basis of the first control code and third control code and displaying in the display means, and selecting the pronunciation of the selected letter on the basis of the first control code, second control code and third control code, and displaying in the display means.

The present invention also presents an electronic translator apparatus for displaying the sentence translated into English by the display means, which comprises means for storing the English word and the article by corresponding to each other, and also storing the English word and its plural form by corresponding to each other, and means for controlling for reading out the article corresponding to the English word from the storing means and displaying it by the display means together with the word, and also reading out the plural form corresponding to the English word from the storing means and displaying it in the display means.

According to the invention, the present title data corresponding to the category is read out from the language memory by the operation of the category key, and the explanatory data relating to that title data is read out from the language memory by the operation of a specific key (information key). When the translation key is operated next, the selected explanatory data is translated and displayed.

According to the present invention, further, noun equivalent phrases or related data are displayed parallel in plural languages. Hence, without having to translate the noun equivalent phrases or related data in plural languages, the noun equivalent phrases or related data in plural languages can be easily compared and referred to.

According to the present invention, furthermore, when displaying a sentence containing noun equivalent phrases in one language, if the display capacity of the noun equivalent phrases is over a predetermined display capacity, part of the noun equivalent phrases is omitted in display. Thus, by omitting a part of the display, the display region of the phrases other than the noun equivalent phrases for composing the sentence can be increased.

According to the present invention, moreover, the storing means stores the word data and sentence data separately, and the conversational sentence composing means selects the word data and sentence data stored in the storing means separately, and displays in the display means. Afterwards, the conversational sentence composed by the conversational sentence composing means is translated. Therefore, the types of the data to be recorded are increased, so that more conversational sentences can be displayed.

According to the present invention, still, the storing means stores the data expressing the word in the hankul, the first control code to show whether the final letter of the word has a PACHIM or not, and the second control code for selecting the pronunciation of the character following the word by corresponding to each other, while it also stores the data expressing the sentence in the hankul and the third control code for selecting the character to be added before the sentence. The controlling means selects, when displaying the sentence in succession to the word in the display means, the character to be added between the word and the sentence on the basis of the first control code and third control code, and displays it in the control means, and also select the pronunciation of the selected character on the basis of the first control code, second control code and third control code, and displays it in the display means, thereby displaying the conversational sentence translated in hankul and the pronunciation of the conversational sentence in the display means. Therefore, the conversational sentence can be expressed correctly in hankul depending on the presence or absence of PACHIM.

According to the present invention, still more, the English word and article are stored in correspondence to each other, and the English word and its plural form are also stored in correspondence to each other. When translating, for example, a Japanese sentence into English and displaying in the display means, the article corresponding to the English word is read out from the storing means, or the plural form corresponding to the English word is selected from the storing means, thereby displaying in the display means. Accordingly, an appropriate sentence can be expressed.

The present invention, therefore presents an electronic translator apparatus widened in the translation capacity and very excellent in practicality, because the title data is read out by category key operation, and the explanatory data relating to the title data is read out by information key operation, and is translated.

The present invention can enhance the controllability and convenience when comparing and referring to phrases in two languages.

According to the present invention, again, when displaying a sentence containing noun equivalent phrases in one language, since part of the noun equivalent phrases is omitted in display if the display capacity of the noun equivalent phrases is larger than a predetermined display capacity, the display capacity of the sentence data other than the noun equivalent phrases displayed in the display part is increased, and the listing capacity of the display part may be enhanced.

According to the present invention, also, since the conversational sentence composed by means for composing a conversational sentence is translated by comprising storing the word data and sentence data separately and separately selecting the stored word data and sentence data to display the conversational sentence on the display, the variety of the data to be stored is increased, and the number of conversational sentences to be displayed is increased.

Moreover according to the present invention, the conversational sentence translated in hankul and the pronunciation of the conversational sentence are displayed by the display means. The present invention comprises means for storing the data expressing word in the hankul, the first control code to show if the final letter of the word as a PACHIM or not, the second control code for selecting the pronunciation of the word letter following the word in correspondence to each other, and also storing the data expressing the sentence in hankul and the third control code for selecting the character to be added before the sentence by correspondence to each other, and means for controlling for selecting, when displaying the sentence in succession to the word in the display means, the character to be added between the word and the sentence on the basis of the first control code and third control code and displaying it in the display means, and also selecting the pronunciation of the selected character on the basis of the first control code, second control code and third control code, and displaying it on the display means, so that the conversational sentence can be expressed correctly in hankul, depending on the presence or absence of the PACHIM.

Furthermore according to the present invention, the sentence translated into English is displayed in the display means by means for storing an English word and its article by corresponding to each other, and an English word and its plural form by corresponding to each other, and means for controlling for reading out the article corresponding to the English word from the storing means and displaying it in the display means together with the word, or reading out the plural form corresponding to the English word from the storing means and displaying it in the display means, so that an adequate sentence can be expressed, by adding an article or expressing in a plural form.

BRIEF DESCRIPTION OF THE DRAWINGS

These and other objects of the present invention, as well as the features and advantages thereof, will be better understood and appreciated from the following detailed description taken in conjunction with the accompanying drawings, in which:

FIG. 1 is a diagram showing a display example in a conventional electronic translator apparatus;

FIG. 2 and FIG. 3 are diagrams for explaining the PACHIM in Korean;

FIG. 8 is a diagram for explaining the data translating method;

FIG. 12 is a diagram showing a key operation example using the data format in FIG. 10;

FIG. 13 is a diagram showing a key operation example using the data format in FIG. 11;

FIG. 15 is a diagram showing a display example;

FIG. 17 is a diagram showing a display example when phrases in two languages are expressed in plural screens;

FIG. 18 is a diagram showing a display example of pronunciation;

FIG. 21 is a diagram showing a display example;

FIG. 26 is a diagram showing a key operation in guide mode and display operation by this operation;

FIG. 28 is a diagram showing key operation in PA-CHIM processing and an example of related display;

FIG. 29 is a diagram showing data formats of word data and sentence data;

FIG. 31 is a diagram showing a practical example of key operation in English-Japanese translation mode and its display;

DETAILED DESCRIPTION OF THE PREFERRED EMBODIMENTS

Figures 1, 2:
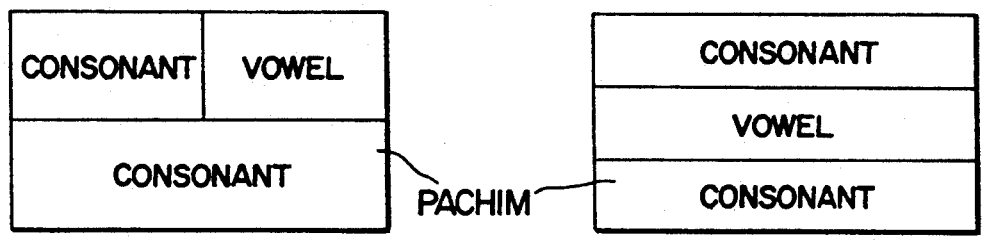

Referring now to the drawings, some of the preferred embodiments of the present invention are described in details below.

Figure 4:
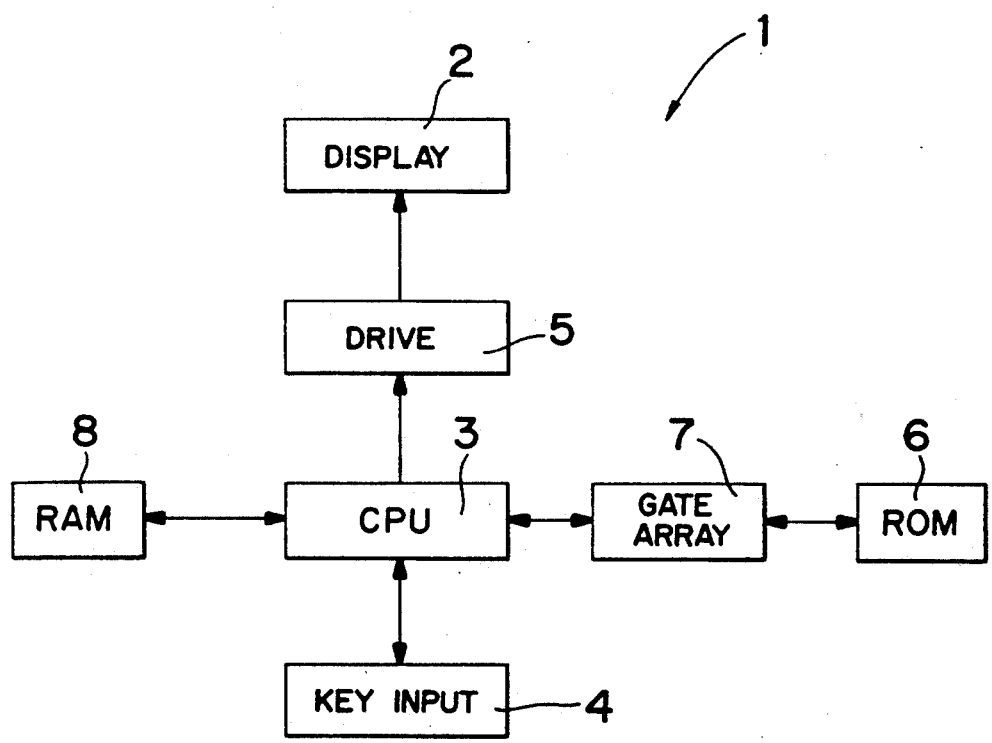
FIG. 4 is a diagram showing the circuitry of an electronic translator apparatus 1 in one of the embodiments of the present invention.
Figure 5:
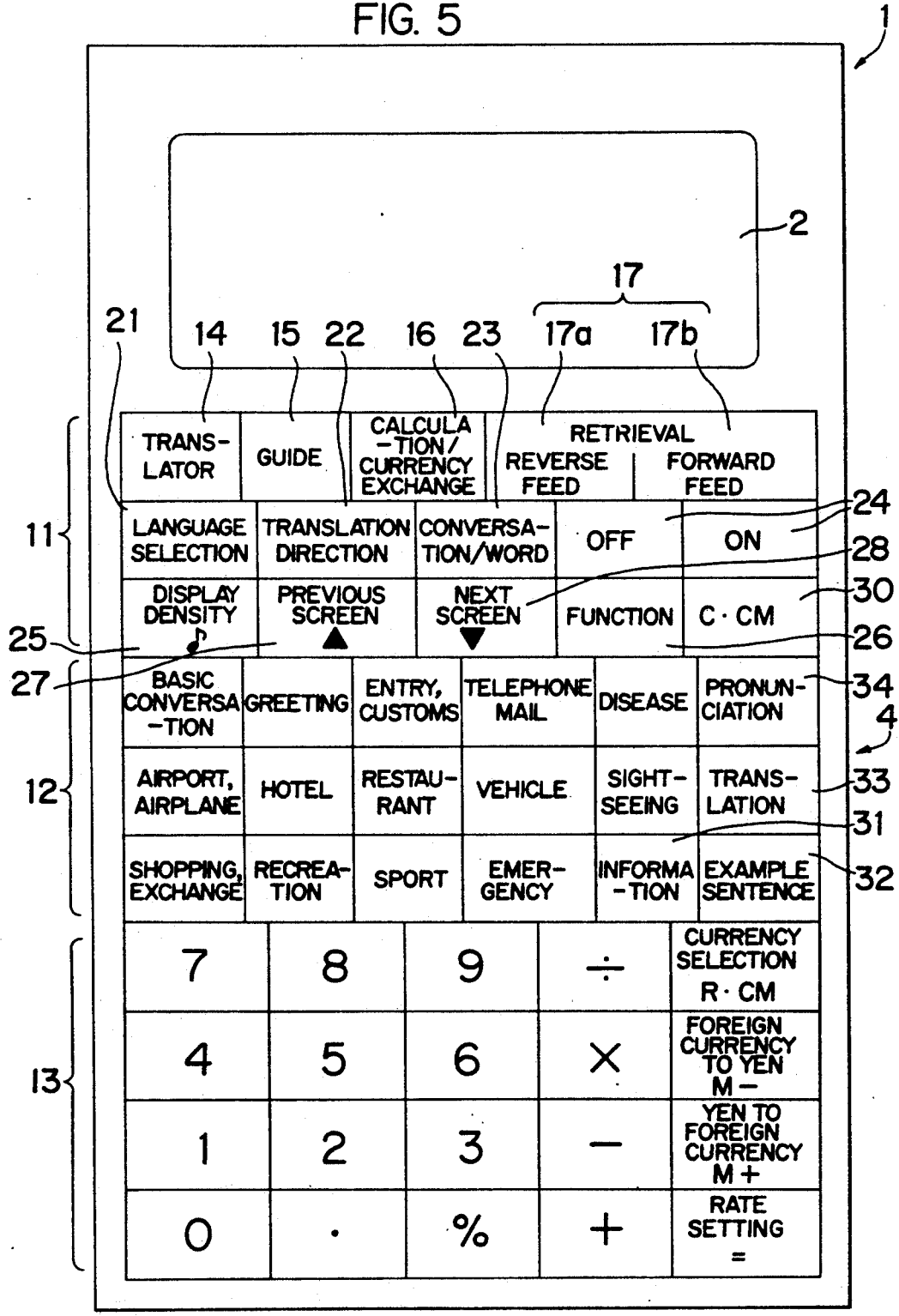
FIG. 5 is a plan view of the electronic translator apparatus 1.

FIG. 4 is a block diagram showing an electric structure of an electronic translator apparatus 1 according to one of the embodiment of the present invention, and FIG. 5 is a plan view of the electronic translator apparatus 1. The electronic translator apparatus 1 comprises a display part 2 which is realized, for example, by liquid crystal display device (LCD), a central processing unit (CPU) 3 for controlling the entire apparatus, and a key input part 4. The display part 2 is connected to the central processing unit 3 through a driving circuit 5. A read-only memory (ROM) 6 contains programs for operating the electronic translator apparatus 1, and phrases and sentences in plural languages for realizing the translation action. This read-only memory 6 is connected to the central processing unit 3 through a gate array 7 for changing over its memory banks. To this central processing unit 3 is also connected a random access memory (RAM) 8 for temporarily storing the pointer flag which is described later or to be used as working region of the display part 2.

The electronic translator apparatus 1 of this embodiment possesses the capability of translating between and among three languages, Japanese, Korean and English, and phrases and sentences relating to these three languages are preliminarily stored in the read-only memory 6. Referring next to FIG. 5, the composition of the key input part 4 and its function are explained below.

The key input part 4 consists of a translation function key group 11, a category key group 12, and a numeric key group 13. In the translation function key group 11, a translator key 14, a guide key 15, and a calculation/currency exchange key 16 are mode setting keys for selectively setting the conversation, word translation mode, Korean guide information translation mode (hereinafter called guide mode), and calculation/currency exchange mode, respectively. A retrieval key 17 is used, for instance in an arbitrary category selected by the category key group 12, for searching a desired noun equivalent phrase. That is, by a reverse feed key 17a and a forward feed key 17b, a desired phrase can be searched from a series of phrases stored cyclically.

A language selection key 21, a language direction key 22, and a conversation/word key 23 are the keys for selectively setting, in the preset conversation, word translation mode or guide mode, the selection of the language of the conversation, word and guide information to be translated, and the translation direction between the languages. At the right side of the conversation/word key 23 in FIG. 5, a pair of power on/off keys 24 are provided. A display density key 25 is for setting the display density of the display part 2 when used together with a function key 26, and usually it is a key for controlling the on/off of the key touch sound. A previous screen key 27 and a next screen key 28 are used for scrolling the display screen. At the right side of the function key 26 in FIG. 5, a clear key 30 is disposed.

The category group 12 involves 14 categories preliminarily classified according to the mode of use, and a desired category key can be selected. The categories are basic conversation, greetings, entry/customs, telephone/mail, disease, airport/airplane, hotel, restaurant, vehicle, sightseeing, shopping/exchange, recreation, sport, and emergency, and in the conversation, word translation mode, all these 14 categories from basic conversation to emergency are valid, while in the guide mode, nine categories from the airport/airplane to emergency are valid.

An information key 31 is a key used in the guide mode, and it is used, for example, when displaying the telephone number, address or explanation relating to the Korea guide information such as names of hotels and names of dishes. An example sentence key 32 is used, when the Korea guide information (hereinafter called the title data) such as hotel name and dish name is being displayed in the display part 2, for composing a sentence as a conversational sentence by combining such title data used as the subjects with frequent expressions. A translation key 33 is a key for translating the conversation, word or title data in one language into other language. A pronunciation key 34 is used for displaying the indicated foreign language (e.g. Korean) in katakana. The keys in the numeric key group 13 are used in calculation/foreign exchange mode.

Figure 6:
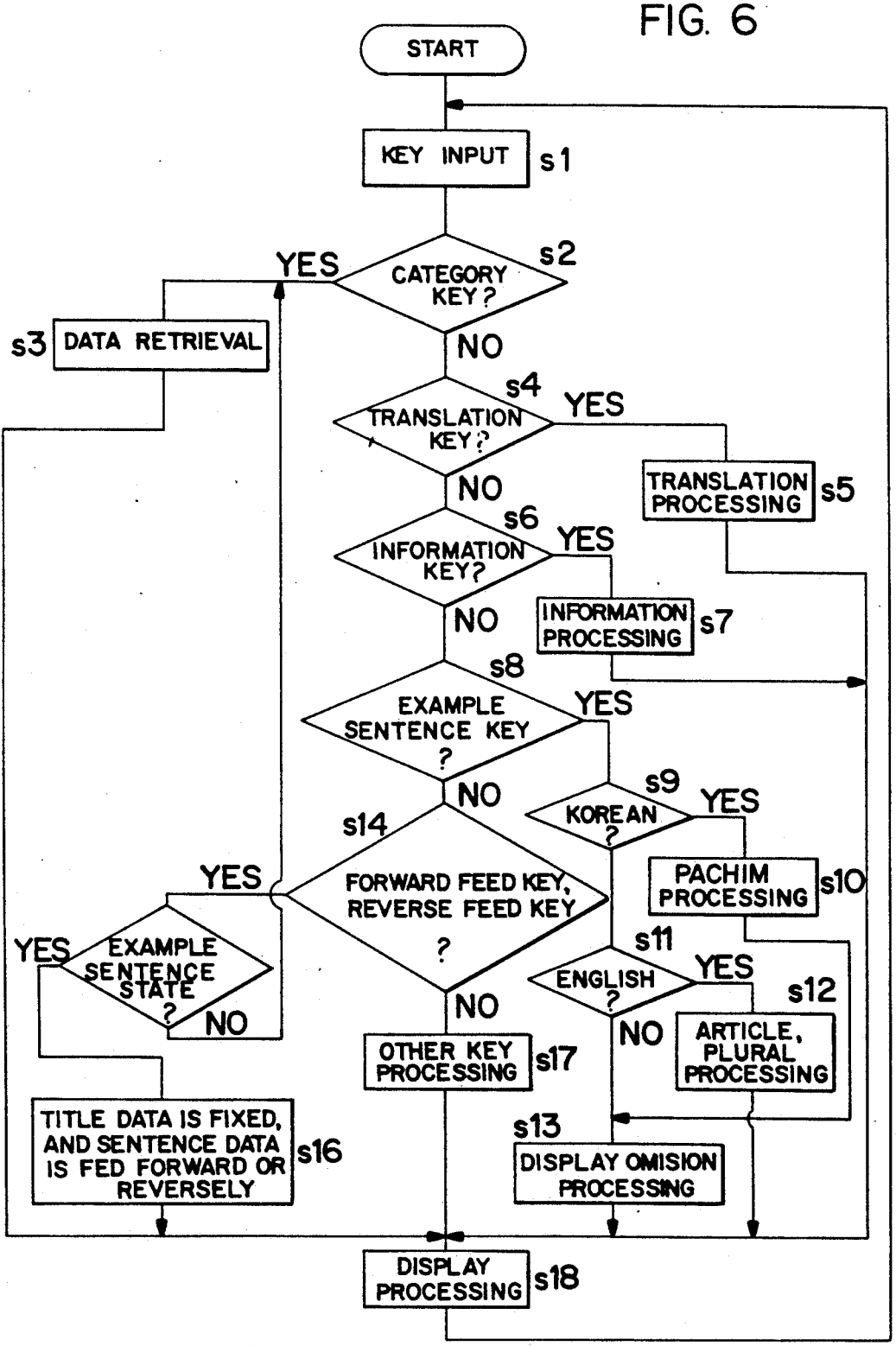
FIG. 6 is a flow chart of key processing of the electronic translator apparatus 1.

FIG. 6 is a flow chart of various key processings of the electronic translator apparatus 1.

When a key input is made at step S1, the operation is branched into individual keys. At step S2, in the case of category key group 12, if judged affirmatively, the data is retrieved at step S3, and is then displayed at step S18 in the display part 2, thereby waiting for next key input, and then the next key processing starts at step S1 again.

In the case of translation key 33 at step S4, if judged affirmatively, the translation is executed at step S5, and the same processing as mentioned above is done at step S18.

At step S6, in the case of information key 31, if judged affirmatively, the information is processed at step S7.

In the case of example sentence key 32 at step S8, if judged affirmatively, the example sentence is processed from step S9 to step S13. In this case, if the language is Korean, if judged affirmatively at step S9, the PACHIM processing is done at step S10. In the case of English, if judged affirmatively at step S11, the article or plural form is processed at step S12, and the display processing is done at step S18. Advancing from step S10 to step S13 in the case of Korean, and from step S11 to S13 in the case of Japanese, the display omission processing of the title data of example sentence is effected, and the display processing is done at step S18.

In the case of forward feed key 17b and reverse feed key 17a at step S14, if judged affirmatively, the operation advances to step S15. In this case, when this key is pressed, in the event of forward feed key 17b or reverse feed key 17a in the state of example sentence at step S15, if affirmative, that is, if in the state of example sentence, the title data is fixed at step S16, and only the next sentence data is fed forward and reversely, and next example sentence data is created, and is displayed at step S18. If negative, the operation returns to step S3.

If negative at step S14, the operation advances to step S17, and other key processing is done, and is displayed at step S18.

Figure 7:
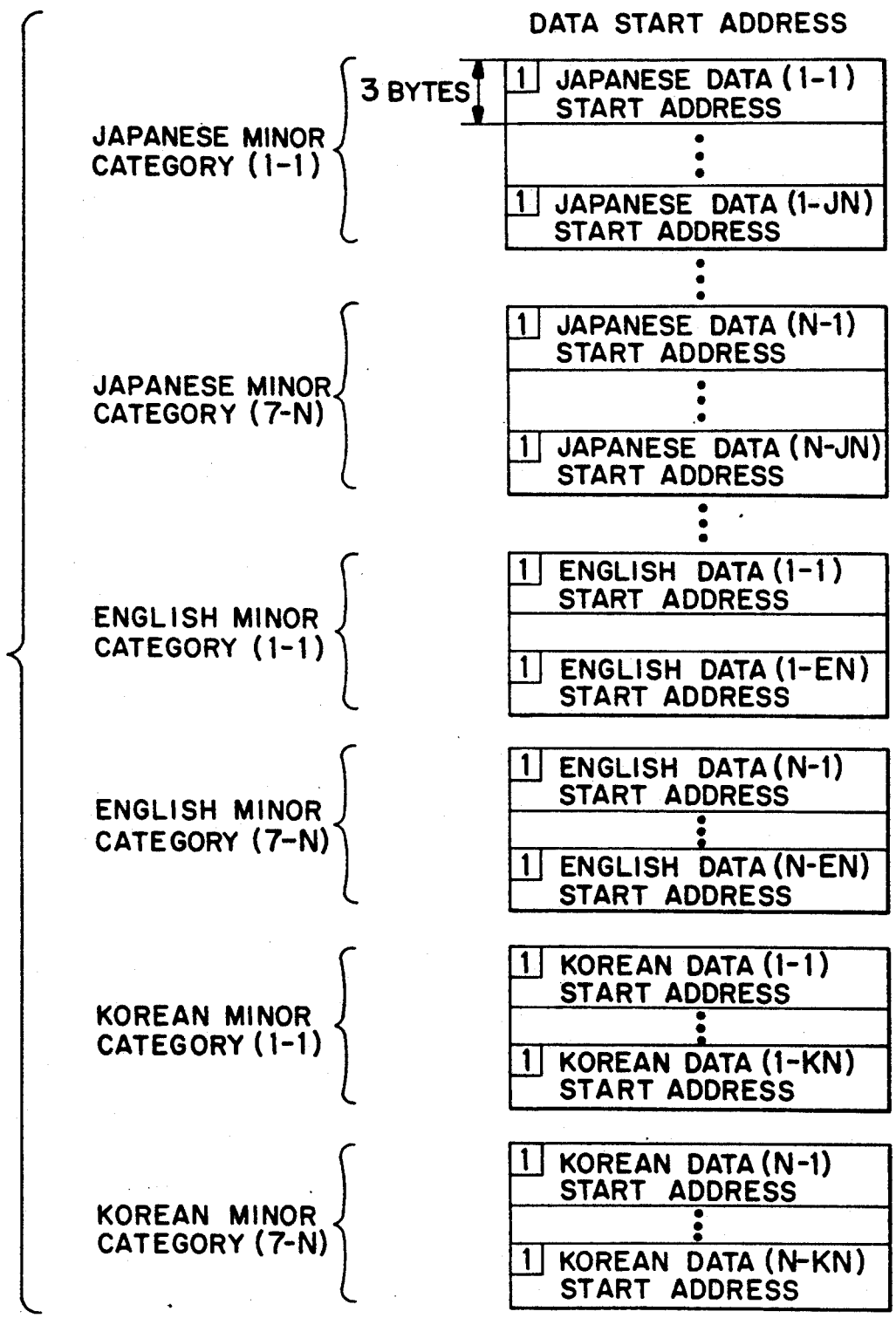
FIG. 7 is a diagram for explaining the data retrieval method.
Figure 7:
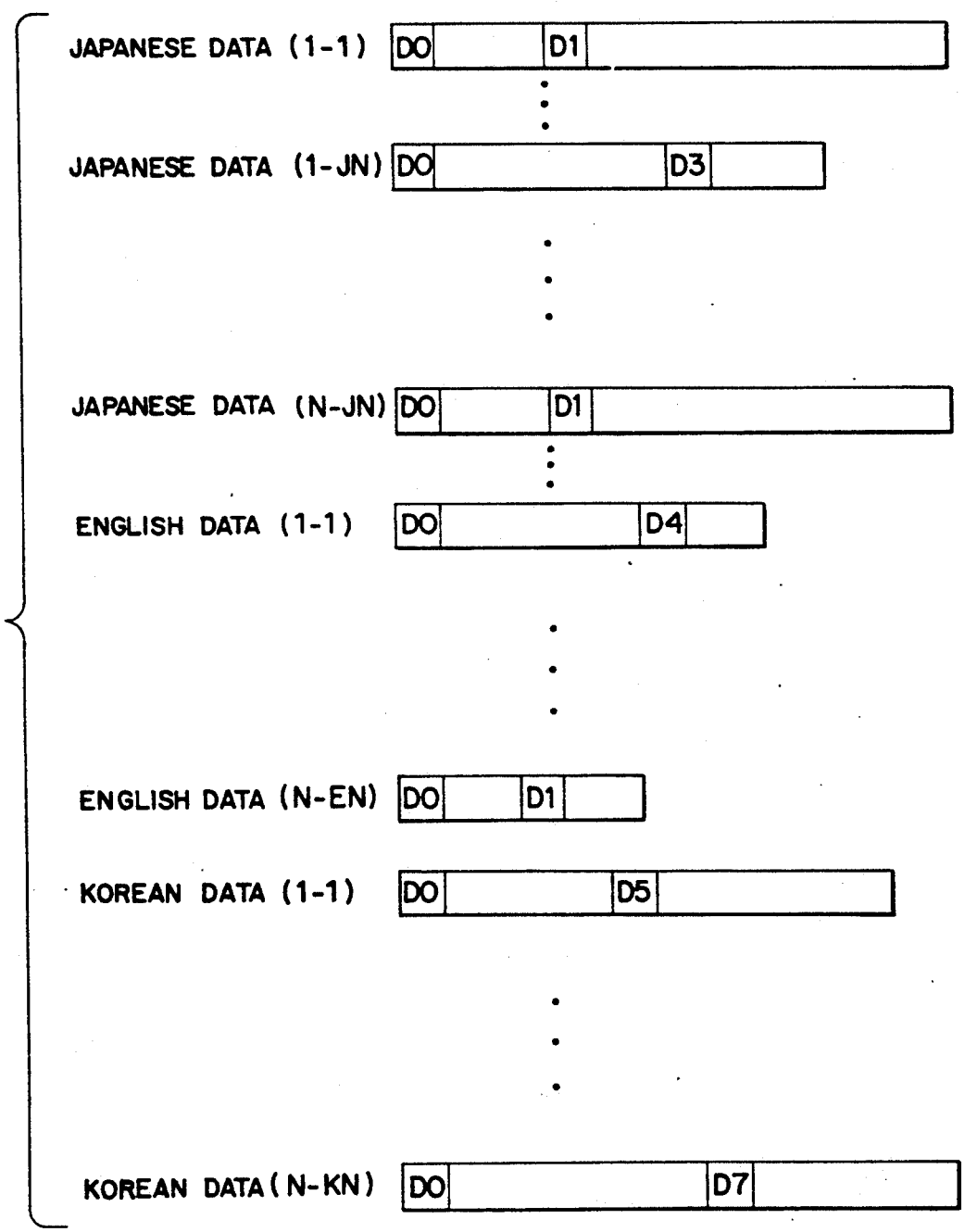

FIG. 7 shows a data retrieval method.

The data of this electronic translator apparatus 1 is composed of two data retrieval tables index ID1, index ID2 and an actual data storing part as shown in FIG. 7. That is, the data composition is divided into the index ID1 in which each category group is classified into items, the index ID2 in which the start address of actual data is stored, and the data part in which the language data is stored. The two index parts ID1, ID2 are individually composed of three bytes, and the control codes are built in the language data, and these control codes are used for pronunciation, translation, example sentence, information guide classification, etc.

This electronic translator apparatus 1 is capable of translating between and among Japanese, Korean and English, and therefore index and data parts are provided independently.

The method of retrieval is explained below. When an arbitrary category key is pressed among the category key group, first the data of the index ID1 corresponding to that category is selected. This three-byte information is the data address information corresponding to the index ID2 in the next stage, and the index ID2 is determined. The three-byte information of the index ID2 is the data start address information of the actual language data in the next stage, and hence the starting point of the actual language data is determined, and the data is stored until the code FF comes to the character buffer as explained later.

The index ID1 and index ID2 are stored in the RAM 8, and these pieces of information are utilized in the next operation. For example, in the case of forward feed action as next data retrieval, without using the language data part, the start address of next language data is determined by adding 3 bytes to the present address of the index ID2 in order to determine the next data start address in the index ID2, and by storing the language data in the character buffer same as in the case above, the forward feed operation is terminated. Here, the most significant bit (MSB) "1" of the beginning data of each minor category of the index ID2 denotes the division of the minor categories. In the forward feed operation stated herein, by searching the location where the MSB of the next data is "1", the movement of the minor category is numerically detected, and 3 is added to the address of the index ID1 of the previous stage, so that the beginning address of the next minor category is determined.

FIG. 8 relates to the data translating method.

The translation processing is done by using the value of the RAM 8 (stored from ROM 6 into RAM 8 when the translator power is turned on) storing the start address of the beginning data of the index ID2 in every language as shown in FIG. 8 (1) as well as the above index ID2. FIG. 8 (2) shows an example of translating the Japanese data into Korean.

In the diagram, the present pointer d is the value of the Japanese index ID2. First, the differential address f of this present pointer d and the beginning address a of Japanese (equal to a) is calculated according to formula I.

$$(Differential\ address) = (present\ pointer\ address) - (beginning\ address\ of\ Japanese) \quad (1)$$

Next, as shown in formula (2), when the calculated differential address f is added to the beginning address c of Korean which is the translation destination language, the index ID2 is determined as the translation destination pointer address e.

$$(Translation\ destination\ pointer\ address) = (beginning\ address\ of\ Korean) + (differential\ address) \quad (2)$$

In this way, when the index ID2 is replaced by the translation destination information, the actual language data is substantially translated.

Figure 9:
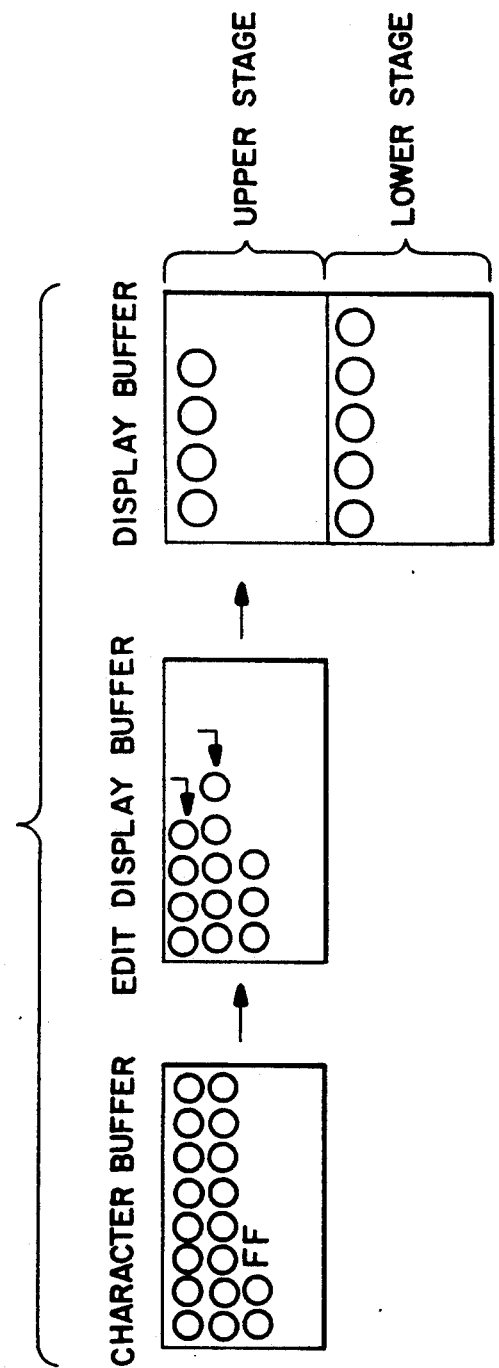
FIG. 9 is a diagram for explaining the display processing.

FIG. 9 is a diagram showing display processing.

In the diagram, the regions of character buffer and edit display buffer are preserved within the RAM 8, and the display buffer is kept in the RAM built in the driving circuit 5.

The display processing is shown in the display part 2 in FIG. 5 by the buffer operation in three stages.

First, by the data address in the ROM 6 shown by the start address of the language data as the information of the index ID2 determined by the above data retrieval processing, the language data is transferred to the character buffer, and this transfer action is terminated by "FF" which is the data termination code. The data stored in the character buffer is subjected to code processing by line feed code (0D) and pronunciation start code, and a stepped operation same as in the actual screen is conducted, and is transferred and stored in the edit display buffer. When transferring these codes into the display buffer, the font development of the Chinese character code, Korean code, English code, etc. is operated by using the display CG stored in the ROM 6, and as a result of this series of operations, characters and symbols such as double acute brackets are displayed in the display part 2.

Every embodiment is described in details below.

First is explained the method of storing the title data and the explanatory data relating to the title data, together with its reading and translation.

Figure 10:
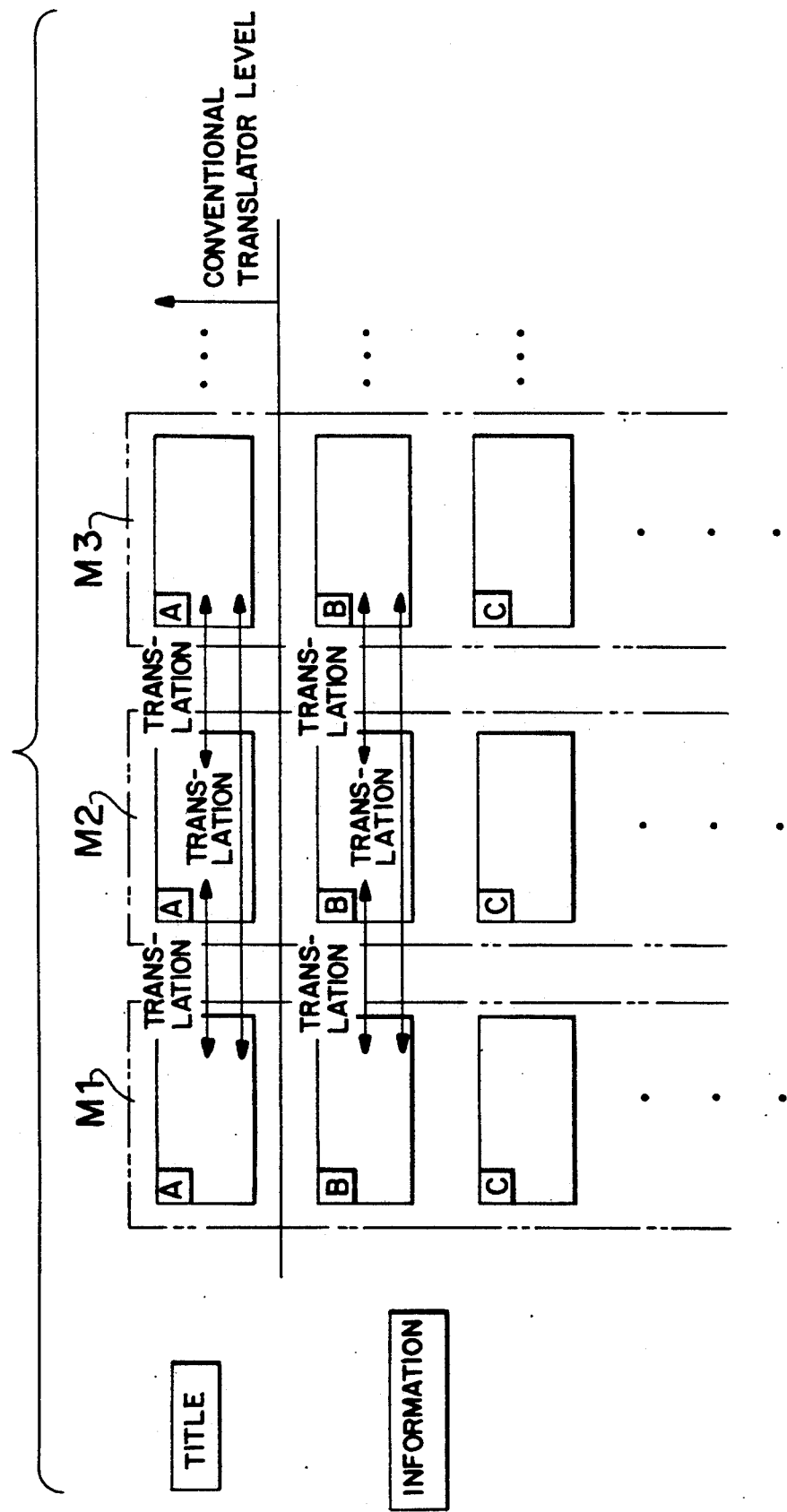
FIG. 10 is a diagram showing a data format.

FIG. 10 shows a data format of Korea guide mode. Language memories M1, M2, M3 are provided in the ROM 6.

The title data common to the language memories M1, M2, M3 are provided with the control code A at the beginning of each. Therefore, the common title data can be translated between languages in two directions. So far, same as in the prior art, but in the data format of the invention, furthermore, the explanatory data relating to the title data (indicated by control codes B, C, ...) are stored in the language memories M1, M2, M3. Accordingly, in this data format, after selecting the title data of control code A, desired explanatory data can be selected by the information key 31 out of the explanatory data indicated by control codes B, C, ..., and can be translated.

Figure 11:
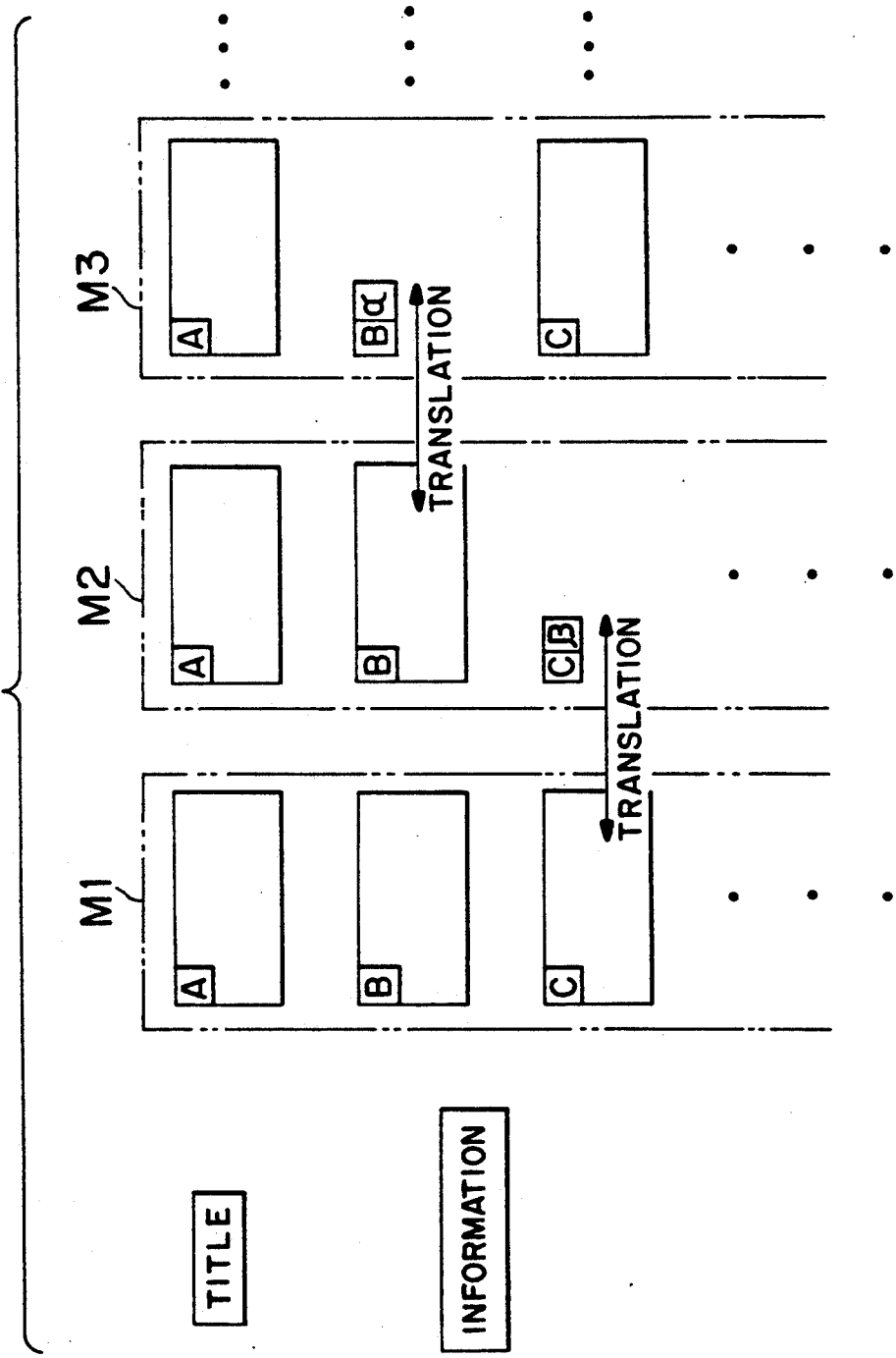
FIG. 11 is a diagram showing other data format.

FIG. 11 is a diagram showing an example of other data format, and in this example, the capacity of the memory data is cut short. That is, if the content provided with the control code B of language memory M2 and the content provided with the control code B of language memory M3 are identical, the data is not directly stored in the language memory M3 as it is, but is provided with 1-byte code α representing the common data, thereby showing the presence of common data. If the content corresponding to control code C is not present in the language memory M2, a code β representing absence of data (NULL code) is attached after the control code C, showing there is no destination of translation in this place.

FIG. 12 is a diagram showing basic operation example and display example of the electronic translator apparatus 1 on the basis of the data format in FIG. 10.

In the initial screen shown in FIG. 12 (1), when a desired category key, for example, the sport key, is pressed, the title data (in Japanese) is displayed as shown in FIG. 12 (2). Here, as shown in FIG. 12 (3), when the translation key 33 is pressed, the title data is translated into other language (English). Or when the information key 31 is pressed when the title data is displayed, as shown in FIG. 12 (4), the explanatory data (in Japanese) of the title data is displayed. In this state, when the translation key 33 is pressed, the explanatory data is translated and displayed in other language (English) as shown in FIG. 12 (5). Furthermore, in this state, when the function key 26 and translation key 33 are operated simultaneously as shown in FIG. 12 (6), it is translated into a further different language (Korean) and displayed.

FIG. 13 is a diagram showing basic operation example and display example of the electronic translator apparatus 1 on the basis of the data format in FIG. 11.

In the initial screen shown in FIG. 13 (1), a category key, for example hotel key, and information key 31 are operated simultaneously, and the explanatory data of the title data is displayed as shown in FIG. 13 (2). In this case, a telephone number is shown, and since it is expressed the same in other language, and when translated, the common data code α explained in relation to FIG. 11 is identified, and the data is called from the same place. At this time, the action of translation can be recognized by the display of symbol "茶".

Or, in the initial screen, when the vehicle category key is pressed, "クラシ—" is displayed as shown in FIG. 13 (4). When the information key 31 is pressed as shown in FIG. 13 (5), the explanatory data of taxi appears. In this taxi category, there is no English data, and only NULL code β explained in FIG. 11 is inserted, and when translated, the symbol "******" meaning there is no destination of translation appears as shown in FIG. 13 (6), and after a certain time, the previous data appears again as shown in FIG. 13 (7).

Explained next is the display method for parallel display in plurality of the noun equivalent phrase and the related data.

Figure 14:
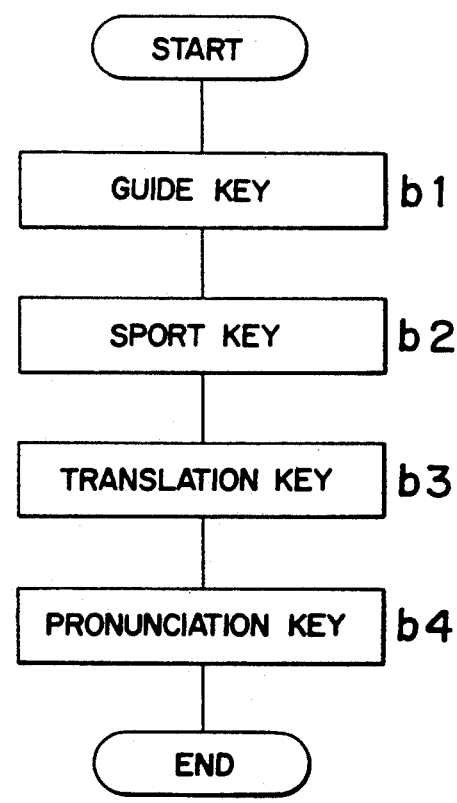
FIG. 14 is a flow chart showing an example of key input operation when translating from Japanese into Korean.

FIG. 14 is a flow chart for explaining an operation example for translating from Japanese into Korean, and FIG. 15 is a corresponding display example diagram.

At step b1, when the guide key 15 is pressed, the screen shown in FIG. 15 (1) appears in the display part 2, telling that the operation is the Japanese-Korean translation mode for translating from Japanese into Korean. At step b2, when the sport key is pressed from the direction of the category key group 12, the display part 12 shows, for example, "アーチェリ—" (see FIG. 15 (2)).

When the translation key 33 is pressed at this time (step b3), the screen shown in FIG. 15 (3) appears in the display part 2. That is, the hankul and the English expression in Korea corresponding to the Japanese "アーチェリ—" are shown. Here, in the upper display area 2a of the display part 2, hankul expression is shown as the first language, and in the lower display area 2b, the English notation in Korea is shown as the second language. Thus, since hankul and the corresponding English notation in Korea are simultaneously displayed in parallel, these words can be easily compared and seen at a glance. For the Japanese people, the meaning can be estimated from the lower English expression, and it is very convenient for the travelers in Korea. In fact, in the subway station displays and restaurant menus in Korea, these two expressions are shown at the same time.

At step b4, when the pronunciation key 34 is pressed, the pronunciations of the first and second languages are displayed in katakana in the display part 2 (see FIG. 15 (4)). Therefore, when checking the pronunciations of two languages, since the pronunciations of the first and second languages are shown parallel at the same time, they can be easily compared with each other, which is very convenient.

Figure 16:
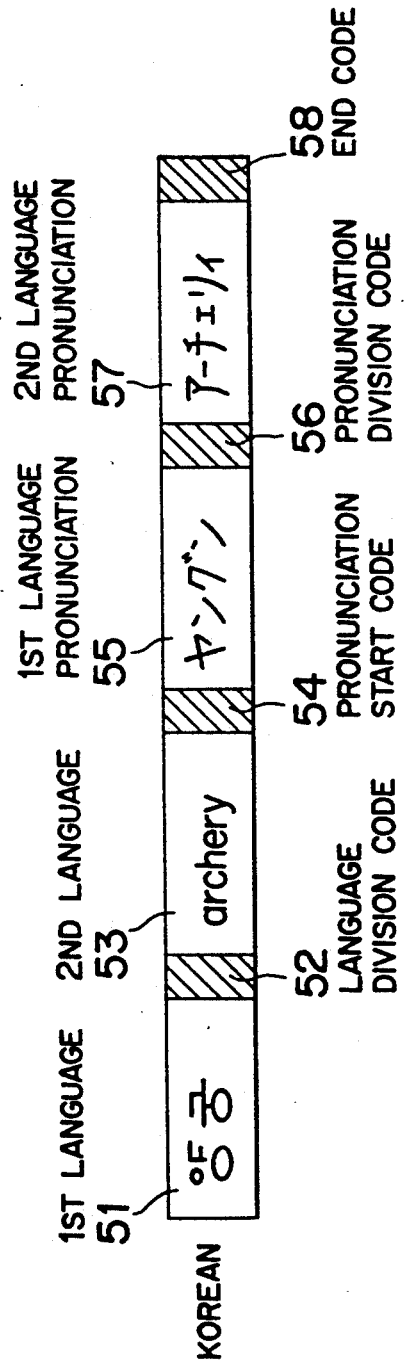
FIG. 16 is a schematic diagram of data format for realizing a parallel expression of two languages.
Figure 16:
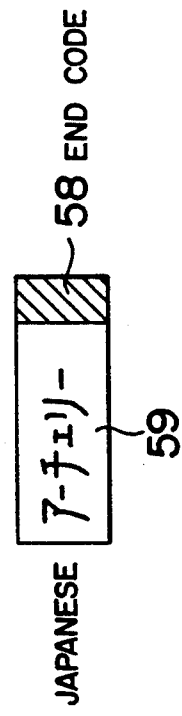

FIG. 16 is a schematic diagram of data format for realizing such two-language parallel display. A data format 50 of Korean is shown in FIG. 16 (1), and a data format 60 of Japanese is given in FIG. 16 (2). The data format 50 of Korean is sequentially composed of a first language code 51 relating to Korean (hankul) as the first language, a language division code 52, a second language code 53 relating to the English notation in Korea as the second language, a pronunciation start code 54, a first language pronunciation code 55 relating to pronunciation of the first language, a pronunciation division code 56, a second language pronunciation code 57 relating to pronunciation of the second language, and an end code 58. That is, between sets of data relating to a specific phrase, the language division code 52, pronunciation start code 54, pronunciation division code 56 and other control codes are inserted, thereby composing the data format 50. The language division code 52 and the pronunciation division code 56 are codes meaning line feed. The pronunciation start code 54 indicates that the subsequent data codes are data codes relating to pronunciation. The data format 60 of Japanese is composed of Japanese language code 59 and end code 58.

Referring to FIG. 14 and FIG. 15, when the sports key is pressed at step b2, the Japanese language data (Japanese language code 59) conforming to the data format 60 of Japanese is decoded from the read-only memory (ROM) 6 into the random access memory (RAM) 8. Afterwards, when the translation key 33 is pressed, the data conforming to the data format 50 of Korean is decoded from the read-only memory (ROM) 6 into the random access memory (RAM) 8, and the data before the pronunciation start code 54 is displayed in the display part 2 (FIG. 15 (3)), and the line is fed after the language division code 52 as mentioned above. When the pronunciation key 34 is pressed next, the data enclosed between the pronunciation start code 54 and the end code 58 is displayed (FIG. 15 (4)), and the line is fed after the pronunciation division code 56.

FIG. 17 is a diagram showing a display example when the phrases of two languages are larger than one screen, and FIG. 18 is a diagram showing a display example of the corresponding pronunciation. In FIG. 17, in three screens from FIG. 17 (1) to FIG. 17 (3), phrases of two languages are displayed parallel, and each screen is scrolled by the operation of previous screen key 27 and next screen key 28. For example, in the display state shown in FIG. 17 (1), when the next screen key 28 is pressed, the screen shown in FIG. 17 (2) appears. In this case, the first language (hankul) is displayed in the upper part of the display part 2, and the second language (English notation in Korea) is displayed in the lower part. By further pressing the next screen key 28, the screen shown in FIG. 17 (3) appears.

When the pronunciation key 34 is pressed in the display state in FIG. 17 (1), the screen shown in FIG. 18 (1) appears. In this case, the pronunciation of only the first language is shown. When the pronunciation key 34 is pressed in the display state of FIG. 17 (2), the screen of FIG. 18 (2) is displayed. In this case, the pronunciations of both first and second languages are displayed. When the pronunciation key 34 is pressed in the display state is FIG. 17 (3), the screen shown in FIG. 18 (3) appears, and in this case the pronunciation of the second language only is displayed. Meanwhile, if the two languages appear in more than one screen, the data format is same as the data format 50 of Korean shown in FIG. 16 (1), and is assigned with code data corresponding to the first language code 51, second language code 53, first language pronunciation code 55 and second language pronunciation code 57.

Figures 19, 20:
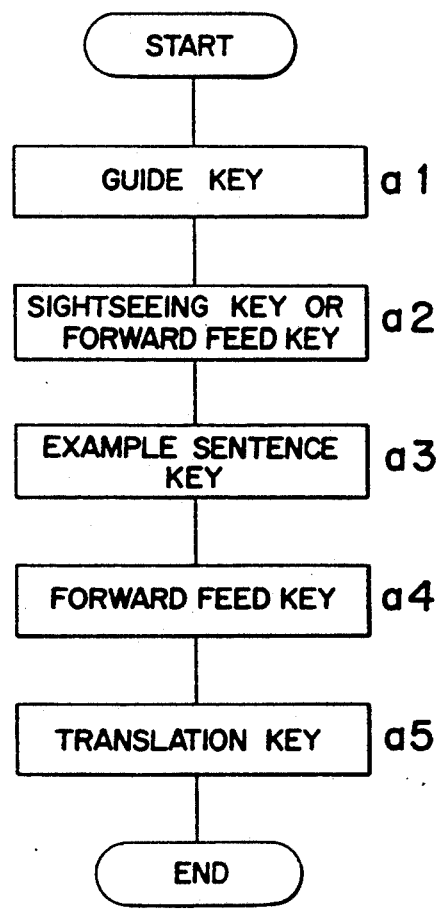
FIG. 19 is a diagram showing a display example when the pronunciations of two languages are identical.
FIG. 20 is a flow chart showing a key input operation relating to omission of processing of title data.

FIG. 19 is a diagram showing a display example when the pronunciations of the first and second languages are identical. That is, while the phrase of which first language and second language are identical in pronunciation is being displayed (FIG. 19 (1)), when the pronunciation key 34 is pressed, only one pronunciation is displayed. It is hence clarified that the two languages are pronounced the same. In this case, the data format includes code data telling nothing is to be displayed in the second language pronunciation code 57.

Thus, in this embodiment, since phrases of two languages can be displayed together, they can be compared at a glance, and the convenience is enhanced. For parallel display of two languages, changeover operation of translation mode or operation of translation key 33 is not particularly needed, and the key input operation is simplified, and the controllability is improved.

Next is described a display method, in which part of the noun equivalent phrase is omitted when the nouns equivalent phrase is larger than the display capacity when displaying a sentence (example sentence) including a noun equivalent phrase in one language.

FIG. 20 is a flow chart for explaining the key operation example in the guide mode, and FIG. 20 is a diagram showing a corresponding display screen.

When the guide key 15 is pressed at step al, the screen shown in FIG. 21 (1) appears in the display part 2, telling that the operation is the Japanese-Korean translation mode for translating from Japanese into Korean in the guide mode. At step a2, when the sightseeing key is pressed in the category key group 12, or when the forward feed key 17b is pressed after the sightseeing key, " ソウル市総合観光案内センター " appears in the display part 2 as the title data (see FIG. 21 (2)).

When the example sentence key 32 is pressed at step a3, the example sentence function using the title data as the subject is realized. In this case, as the example sentence,

■ソウル市総合観光案内センターまで貫せて行って下さい。 is selected, and the screen shown in FIG. 21 (3) is shown in the display part 2. At this time, the title data is enclosed by double acute brackets, and " 観光案内センター " is omitted, and the ellipsis "..." appears instead. By such omission processing, the display area of the sentence data following the title data can be increased, and the entire sentence can be easily recognized. Here, when the next screen key 28 is pressed along the arrow mark indicated by reference code 40 in the screen in FIG. 21 (3), the whole example sentence can be seen. However, this example sentence can be easily judged from the screen shown in FIG. 21 (3), and it is not necessary to press the next screen key 28.

When the forward feed key 17b is pressed at step a4, as the next example sentence,

■ソウル市総合観光案内センターはこの近くですか。■ is selected, and the screen shown in FIG. 21 (4) is displayed in display part 2. In this case, all the sentence data following the title data is displayed, and the whole sentence is known from this screen, and hence there is no particular problem.

When the translation key 33 is pressed at step a5, the screen shown in FIG. 21 (5) appears in the display part 2. That is, the example sentence in Japanese composed at step a4 is translated into Korean (in hankul). At this time, the title data is enclosed in double acute brackets so as to be distinguished from other sentence data, but since the translated language is hard to be understood by the operator and by the third party if omitted, the omission processing is not done, and the translated title data can be correctly transmitted. At step a4, the omission processing is done, but the operator can read the intact title data in the display part 2, and then the omission is processed in the example sentence processing (step a2, see FIG. 21 (2)), and therefore it does not feel strange if the omission processing is done at step a3.

In this way, when composing the example sentence on the basis of title data relatively large in the number of characters, by the omission processing, the content of the example sentence can be understood without key operation of next screen key 28, and the function and controllability are enhanced.

In this embodiment, the translation processing between Japanese and Korea is explained, but the present invention may be easily realized between other languages.

Figure 22:
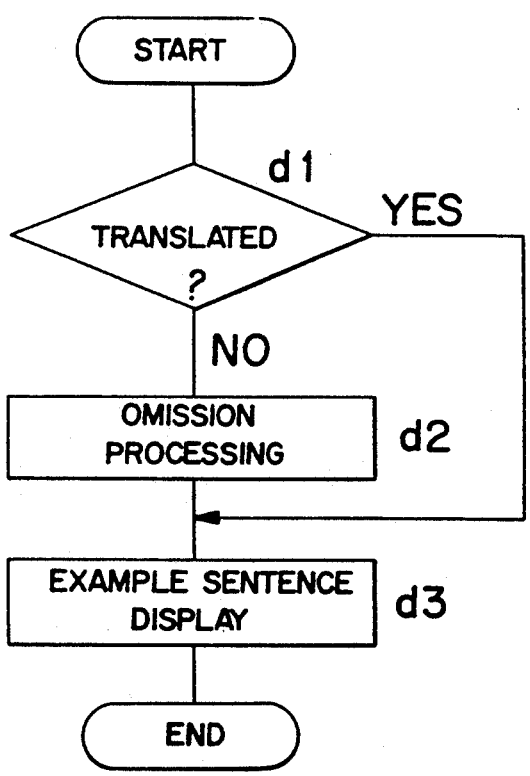
FIG. 22 is a flow chart for explaining the translation processing action in the electronic translator apparatus 1.

FIG. 22 is a flow chart explaining the operation at the electronic translator apparatus 1.

At step dl, it is judged whether the sentence shown presently in the display part 2 has been already translated or not. That is, if a sentence before translation processing is presently displayed, the title data is omitted at step d2, and the example sentence is displayed at step d3 together with the omitted title date.

At step dl, if the presently displayed sentence is judged to be already translated, without omitting the title data, the operation advances to step d3, where the whole sentence is displayed. Meanwhile, if the number of characters of the title data before translation is within a predetermined capacity, omission processing is skipped.

The omission processing of title data is described in further details below.

Figure 23:
FIG. 23 is a diagram showing a display example of omission processing.
Figure 23:
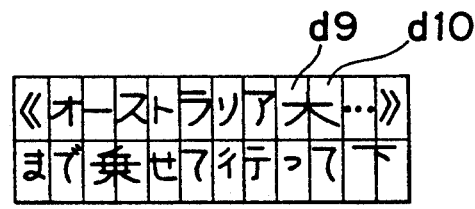
Figure 23:
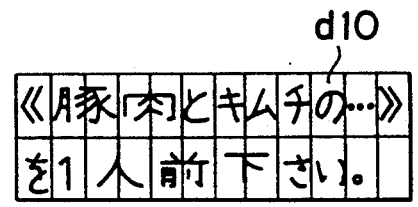

FIG. 23 shows three display examples of omission processing. The display part 2 of this embodiment is composed of the first display region 2a and the second display region 2b. In each display region, 12 half-size characters such as kana or 6 full-size characters such as Chinese characters can be displayed. Hereinafter, for the sake of convenience of explanation, each display region is divided into 12 sections, called sequentially from the left end (the beginning of display data) as first display region, second display region, ..., the twelfth display region.

In the display example shown in FIG. 23 (1), as the title data, " 日本総領事館 " is selected. In this case, the full-size character " 事 " corresponds to the tenth display region d10 and the eleventh display region d11, and when the title data is stored in double acute brackets without omitting this " 事 ", there is no display space for inserting the ellipsis "... ". Therefore, a half-size space is inserted in the tenth display region d10, and the ellipsis "..." is inserted right after it.

In the display example shown in FIG. 23 (2), " オーストラリア大使館 " is selected as the title data. In this case, the full-size character " 大 " is inserted in the ninth display region d9 and tenth display region d10, and therefore the ellipsis "..." can be inserted right after this.

In the display example shown in FIG. 23 (3), " 豚肉とキムチの焼き " is selected as the title data. In this case, the half-size character " の " is placed in the tenth display region d10, and therefore the ellipsis "..." can be inserted right after it.

Figure 24:
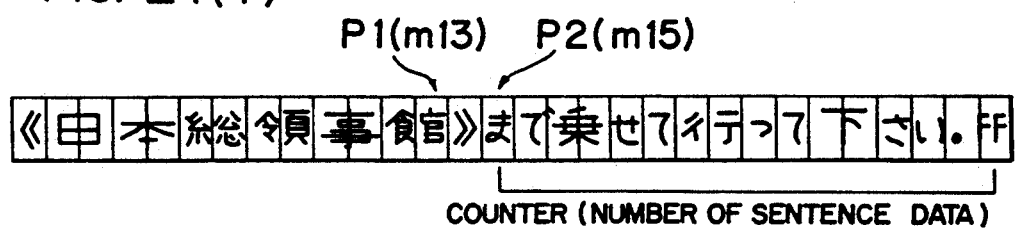
FIG. 24 is a schematic diagram for explaining the omission processing.
Figure 24:
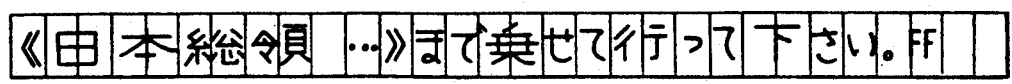

FIG. 24 is a schematic diagram for explaining the omission processing action. FIG. 24 (1) shows the data memory mode corresponding to each character in the sentence before the omission processing of the example sentence in FIG. 23 (1), that is,

" 《日本総領事館》で家せし行って下さい ".

In other words, with respect to the first display region, second display region and so forth in the display part 2, the first memory region, second memory region, and so forth are provided in the random access memory 8, and the data to be displayed is stored in correspondence thereto.

When omitting the example sentence shown in FIG. 24 (1), a first pointer Pl is set in the thirteenth display region m13 corresponding to the beginning display region of the second stage of the display part 2, and a second pointer P2 is set in the memory region right after " > ". In this example sentence, the second pointer P2 is set in the firteenth memory region m15. From the memory region corresponding to the second pointer P2 till the memory region where the final code FF is stored, the number of memory regions is counted, and the result is set as the number of sentence data sets.

After such series of setting operation, the memory region corresponding to the second pointer P2 is shirted to the left side (the beginning side of a sentence) by the number of sentence data sets up to the memory region corresponding to the first pointer Pl, and the omission is processed by performing the processing explained in relation to FIG. 23 (see FIG. 24 (2)). Incidentally, the setting memory region of the first pointer Pl is always the thirteenth memory region m13, while the setting memory region of the second pointer P2 varies depending on the number of characters of the title data.

Figure 25:
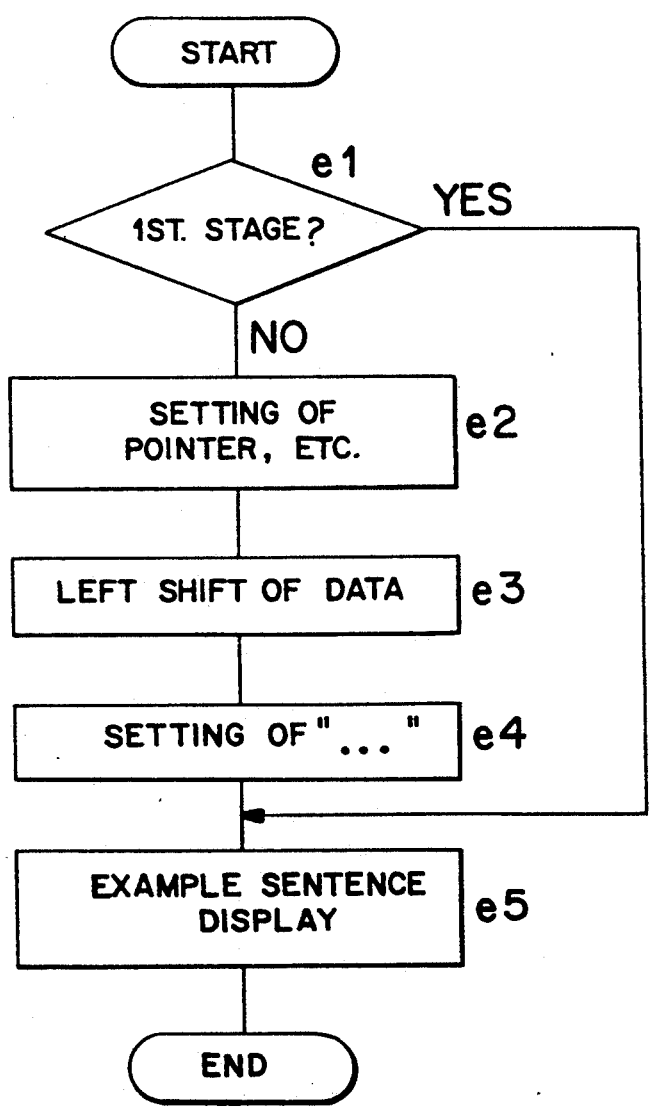
FIG. 25 is a flow chart for explaining the omission processing.

FIG. 25 is a flow chart for explaining the operation.

At step el, it is judged whether the title data can be stored in the memory region 2a of the first stage or not. In this case, 12 half-size characters can be inserted into the display region 2a of the first stage, but since a pair of double acute brackets must be inserted for the space of two half-size characters, substantially the title data exceeding 10 half-size characters cannot be inserted in the first stage. If judged affirmatively at step el, the operation advances to step e5, and the whole selected example sentence is displayed without being omitted.

If judged negatively at step el, the omission processing is done at steps e2 to e4. Specifically, at step e2, after setting of the first pointer Pl, second pointer P2 and the number of sentence data sets as explained above, the data is shifted with respect to the second pointer P2 (step e3). At step e4, the ellipsis "..." is set, and the omitted title data and the succeeding sentence data are displayed at step e5.

Explained next are the means for storing the word data and sentence data separately, and the method of composing and translating a conversational sentence (example sentence) by selecting them separately.

The operation of key input part 4 shown in FIG. 5 and an example of display accompanying the operation are shown in FIG. 26.

In FIG. 26, FIG. 26 (1) is a initial screen when the guide mode is selected by the guide key 15. By the restaurant key and the forward feed key 17b, " 精定食 " is selected as the word (title data) to compose an example sentence, and the display becomes as shown in FIG. 26 (2). When the example sentence key 32 is pressed as shown in FIG. 26 (3), the title data " 精定食 " is enclosed in double acute brackets, and the selected title data is emphasized. At this time, the sentence corresponding to the title data is displayed simultaneously, and the sentence can be changed to a desired sentence by pressing the forward feed key 17b or reverse feed key 17a as shown in FIG. 26 (4). By pressing the translation key 33 as shown in FIG. 26 (5), the displayed example sentence is translated into Korean. To know the pronunciation of this Korean sentence, the pronunciation key 34 is pressed, and the pronunciation is displayed in the Japanese katakana as shown in FIG. 26 (6). In this case, too, the title data is enclosed in double acute brackets, and the word is separated from the phrase.

Figure 27:
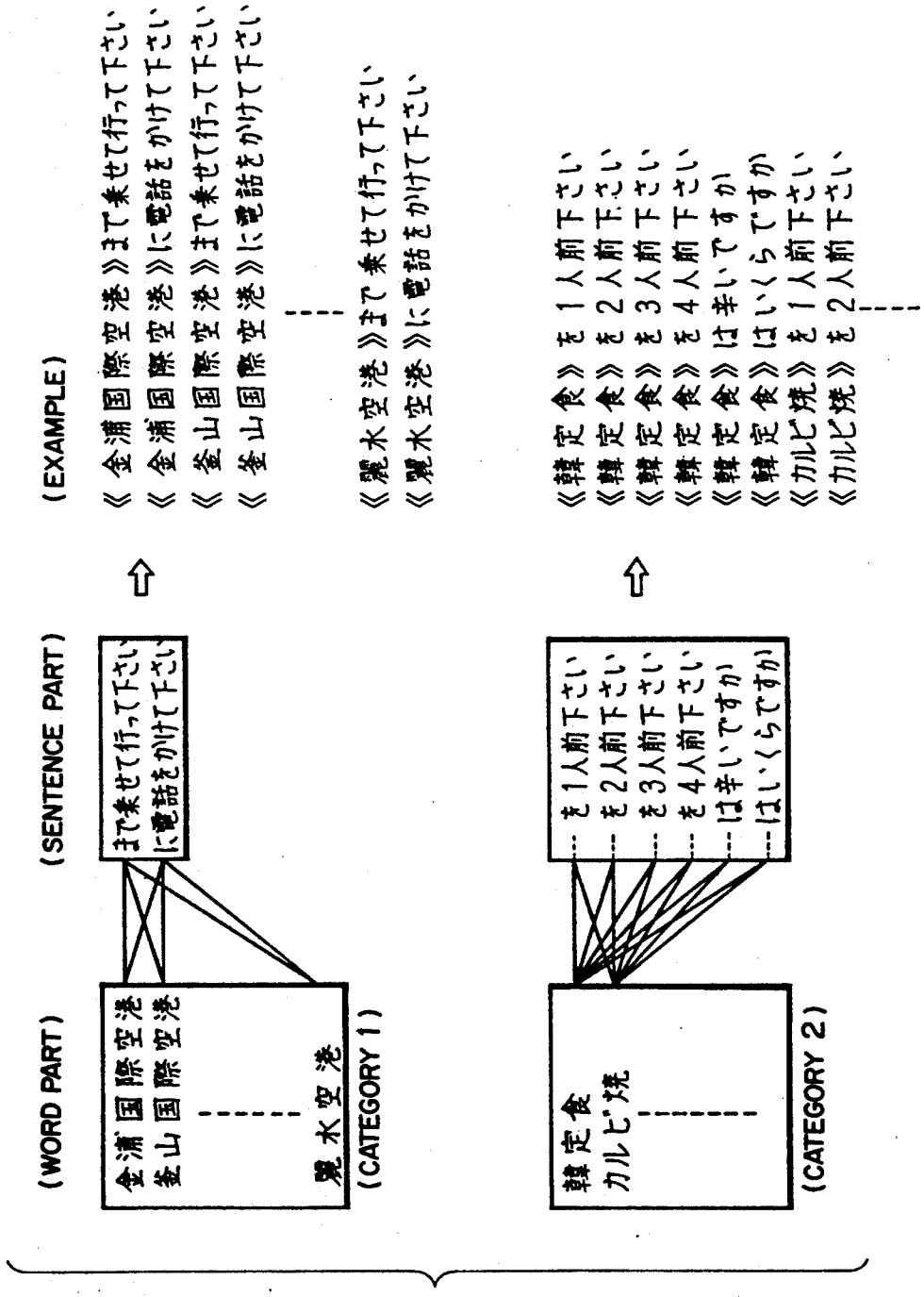
FIG. 27 is a diagram showing words and sentences to be stored in ROM 2, and example sentences composed by combining them.

FIG. 27 shows examples of words stored in the word part of the ROM 6 shown in FIG. 3, sentences stored in the sentence part of the ROM 6, and conversational sentences (example sentences) composed by combining these words and sentences.

As shown in FIG. 27, it is possible to compose a conversational sentence (example sentence) suited to the situation by separately having sentence parts to be combined with every category of words. In the conventional electronic translator apparatus, since the example sentences shown in FIG. 27 were all stored as data, the number of registered example sentences was small, whereas in the electronic translator apparatus 1 of this embodiment, the example sentences can be displayed by the number of the product of the number of words in the word part and the number of sentences in the sentence part, so that the number of example sentences is greater. Moreover, by attaching special data to the data in the word part or to the data in the sentence part, other example sentence may be displayed by changing the sentence part of certain data only, or display of example sentence may be canceled.

Next is explained about the PACHIM control when composing example sentences including Korean.

FIG. 28 shows the operation of key input part 4 shown in FIG. 5 and an example of display accompanying this operation.

In FIG. 28, FIG. 28 (1) is a initial screen when the guide mode is selected by the guide key 15. Next, as shown in FIG. 28 (2), by the category key and forward feed key 17b, the word data in the hankul corresponding to the desired word of "kimchi" is displayed. In this case, the final letter "치" of this hankul word does not contain PACHIM. Then, as shown in FIG. 28 (3), the example sentence key 32 is pressed, and the hankul expression corresponding to " ～를먹고싶어 " is displayed, and "를" is displayed as the hankul corresponding to the Japanese " を ". To know the pronunciation of this hankul, the pronunciation key 34 is pressed, and the pronunciation is displayed in the Japanese katakana as shown in FIG. 28 (4), and corresponding to the Japanese " を ", " ルル " is displayed as the pronunciation of "를". (In this case, the katakana "ル" is not existent in Japanese, but it is shown in order to pronounce the hankul word more accurately.)

Similarly, as shown in FIG. 28 (5), when the hankul corresponding to the word "mask" is displayed, the final letter "크" of this hankul word contains a PACHIM. Therefore, as shown in FIG. 28 (6), the example sentence key 32 is pressed, and the same example sentence as above is displayed, then "을" is displayed as the hankul corresponding to the Japanese " を ". When the pronunciation key 34 is pressed as shown in FIG. 28 (7), similarly, the pronunciation is displayed, and corresponding to the Japanese " を ", " ヌル " is displayed as the pronunciation of "을". Besides, if the PACHIM is present, the pronunciation of "을" varies depending on the type of the PACHIM, and the ending portion of the word data also differs. That is, the hankul shown in FIG. 28 (5) is initially pronounced as " カミョン ", but when incorporated into an example sentence as shown in FIG. 28 (6), it is pronounced as " カミョ " as shown in FIG. 28 (7).

FIG. 29 shows the data formats of word data and the sentence data to be combined therewith. The word data is composed of word region and pronunciation region as shown in FIG. 29 (1). The word region contains a control code C1 to show if the final letter of the word has a PACHIM or not, and the pronunciation region contains a control code C2 for selecting the pronunciation of the letters following that word. The sentence data is composed of sentence region and sentence pronunciation region as shows in FIG. 29 (2), and each region contains a control code C3 for selecting the character to be added before the sentence. Using these three control codes C1, C2, C3, the accurate PACHIM control is effected. Meanwhile, the word data insertion code and word data pronunciation insertion code in the sentence data are the codes for distinguishing where to insert the word data in the sentence, and in the case of the hankul, the word data is placed before the sentence data.

Figure 30:
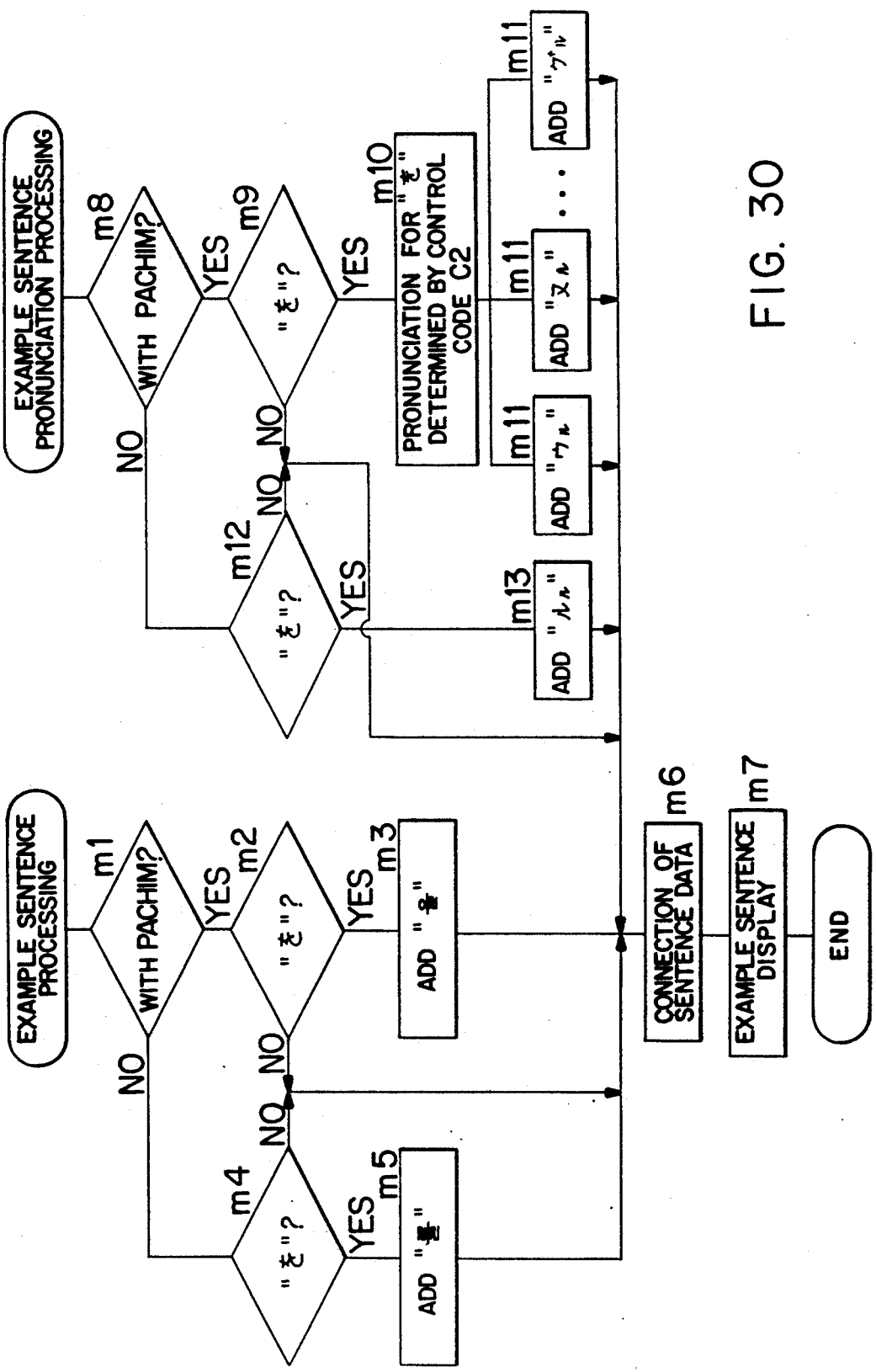
FIG. 30 is a flow chart showing the example sentence processing and pronunciation processing of the example sentence.

FIG. 30 is a flow chart showing the action of display of example sentence by selecting the hankul word corresponding to the Japanese "を" and the pronunciation of this hankul word, when the final letter of the word data has and has not PACHIM.

In FIG. 30, the operation from step m1 to step m7 is a flow for displaying an example sentence, and steps m8 to m13, and steps m6 and m7 relate to the flow of displaying the pronunciation of the example sentence.

When displaying an example sentence, first at step m1, presence of absence of PACHIM is judged on the basis of the control code C1. If the PACHIM is present, at step m2, it is judged on the basis of the control code C3 to see if the character to be added before the sentence is the hankul word corresponding to the Japanese "を" or not. If the case of the hankul corresponding to "を", the operation advances to step m3, and "을" is added when the PACHIM is present, and nothing is added otherwise. In the case of absence of PACHIM, at step m4, judging same as in step m2, in the case of the hankul word corresponding to the Japanese "を", "를" is added at step m5 if without PACHIM, and nothing is added otherwise. After the processing from step m1 to step m5, the remaining sentence character data is connected at step m6, and the example sentence is displayed at step m7.

On the other hand, when displaying the pronunciation of the example sentence, similarly, the presence or absence of PACHIM is judged on the basis of the control code C1 at step m8. If the PACHIM is present, at step m9, it is judged on the basis of control code C3 whether the letter to be added before the sentence is the hankul word corresponding to the Japanese "を" or not. In the case of the hankul word corresponding to "を", the operation advances to step m10, and the pronunciation of the hankul word corresponding to "를" is determined on the basis of the control code C2, and the pronunciation is added at step m11. At this time, the ending portion of the word data is also processed. At step m9, it is not the hankul word corresponding to the Japanese "を", nothing is done, and the operation goes to step m6.

On the other hand, in the absence of PACHIM, the same judgement as in step m9 is effected at step m12, and in the case of the hankul word corresponding to "ᆾ", the pronunciation of "ᆯᆫ" is added at step m13, and otherwise nothing is done and the operation goes to step m6. When the processing from step m8 to step m13 is over, the remaining sentence pronunciation data is added at step m6, and the example sentence is displayed at step m7.

This has been an explanation about processing of the hankul word corresponding to the Japanese "ᆾ", and the same processing is done on the hankul words corresponding to the Japanese "ᆹ", "ᆰ", and "ᆨ".

Thus, by juding if the final letter of the word contains a PACHIM or not, the character to be added between a word and a sentence following that word is selected and displayed, while the pronunciation of the selected character is selected and displayed, so that the conversational sentence in the hankul can be correctly expressed.

Finally, when composing example sentences including English, the control of the definite article, indefinite article and plural form of word is explained below.

FIG. 31 shows the operation of key input part 4 shown in FIG. 5 and practical example of display accompanying the operation.

In FIG. 31, FIG. 31 (1) is an initial screen when the guide mode is selected by the guide key 15. Here, by the emergency key and forward feed key 17b, "Embassy of Japan" is selected as the desired word data to be referred to, and the display becomes as shown in FIG. 31 (2). Next, as shown in FIG. 31 (3), the example sentence key 32 is pressed, and this word data and a corresponding sentence data are combined to display one conversational sentence. In this case, the word data "Embassy of Japan" is enclosed in double acute brackets to be distinguished from sentence data. In this case, the definite article "the" is attached to "Embassy of Japan." Next, as shown in FIG. 31 (4), when the pronunciation key 34 is pressed, the pronunciation of the conversational sentence is displayed in Japanese katakana; in this case, the pronunciation of the definite article "the" is displayed as "ザ" corresponding to the word data "Embassy of Japan."

On the other hand, when "American Embassy" is selected as shown in FIG. 31 (5) to (7), similarly, the definite article "the" is added, and its pronunication is expressed as "ジ". Or, as shown in FIG. 31 (8) to (10), when "Bank of Togyo" is selected, the definite article is not attached, and nothing is displayed as the pronunication.

The examples shown in FIG. 31 refer to the case of the definite article "the", and similarly it is also possible to add the indefinite article "a" or "an" or to display the word data in its plural form.

Figure 32:
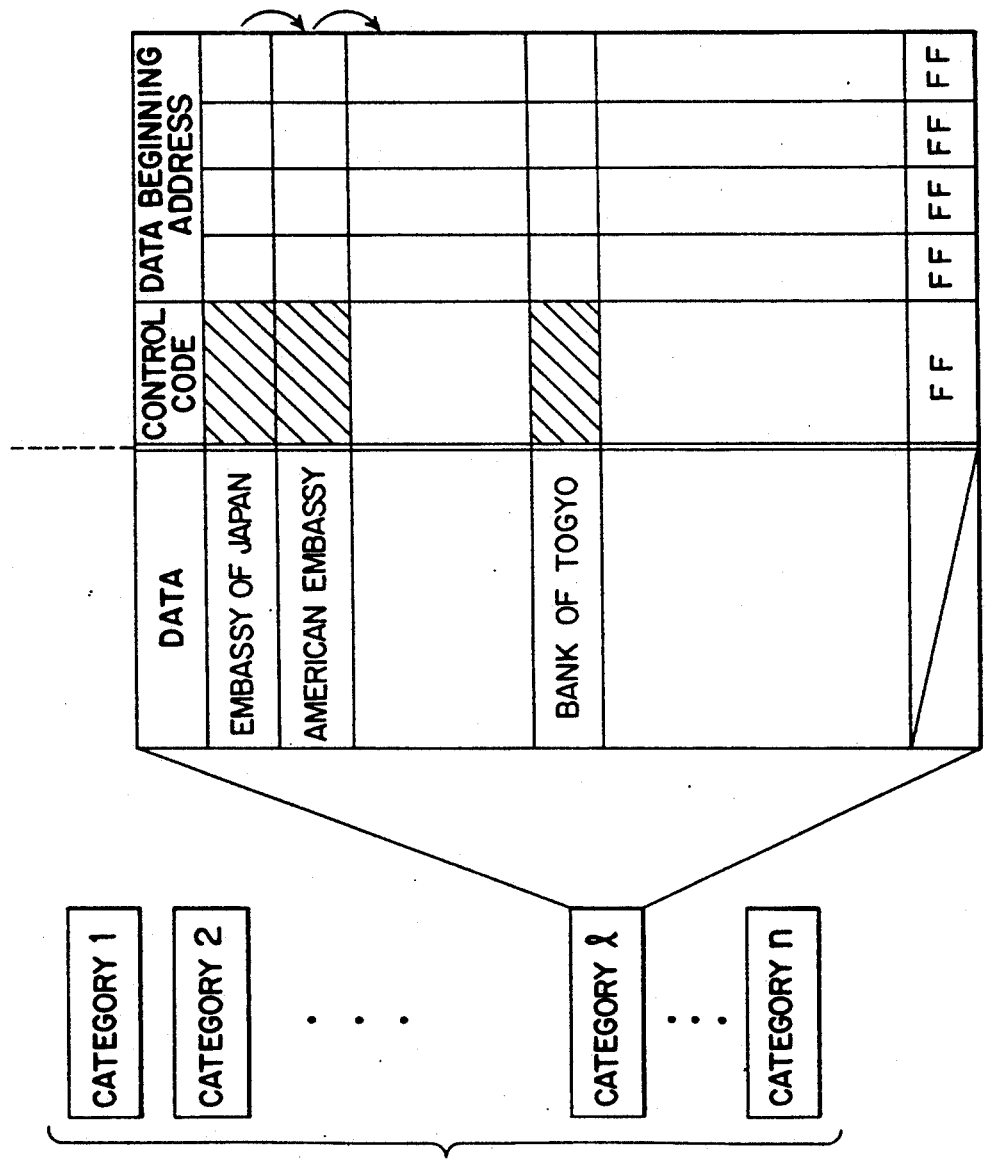
FIG. 32 is a diagram showing a beginning address of word data and table of corresponding control codes.

FIG. 32 is a table showing the data beginning address of word data and the corresponding control code.

The control code is intended to control the action for adding the definite article or indefinite article to the word data in example sentence processing, or displaying in plural form. This table is provided for each category in order to enhance the retrieval speed, and is stored in the ROM 6 shown in FIG. 4. Every word data is composed of three bytes for the data beginning address and one byte for control code, or four bytes in total, and at the end of final data of each table, FF is added by four bytes as the separation code.

Figure 33:
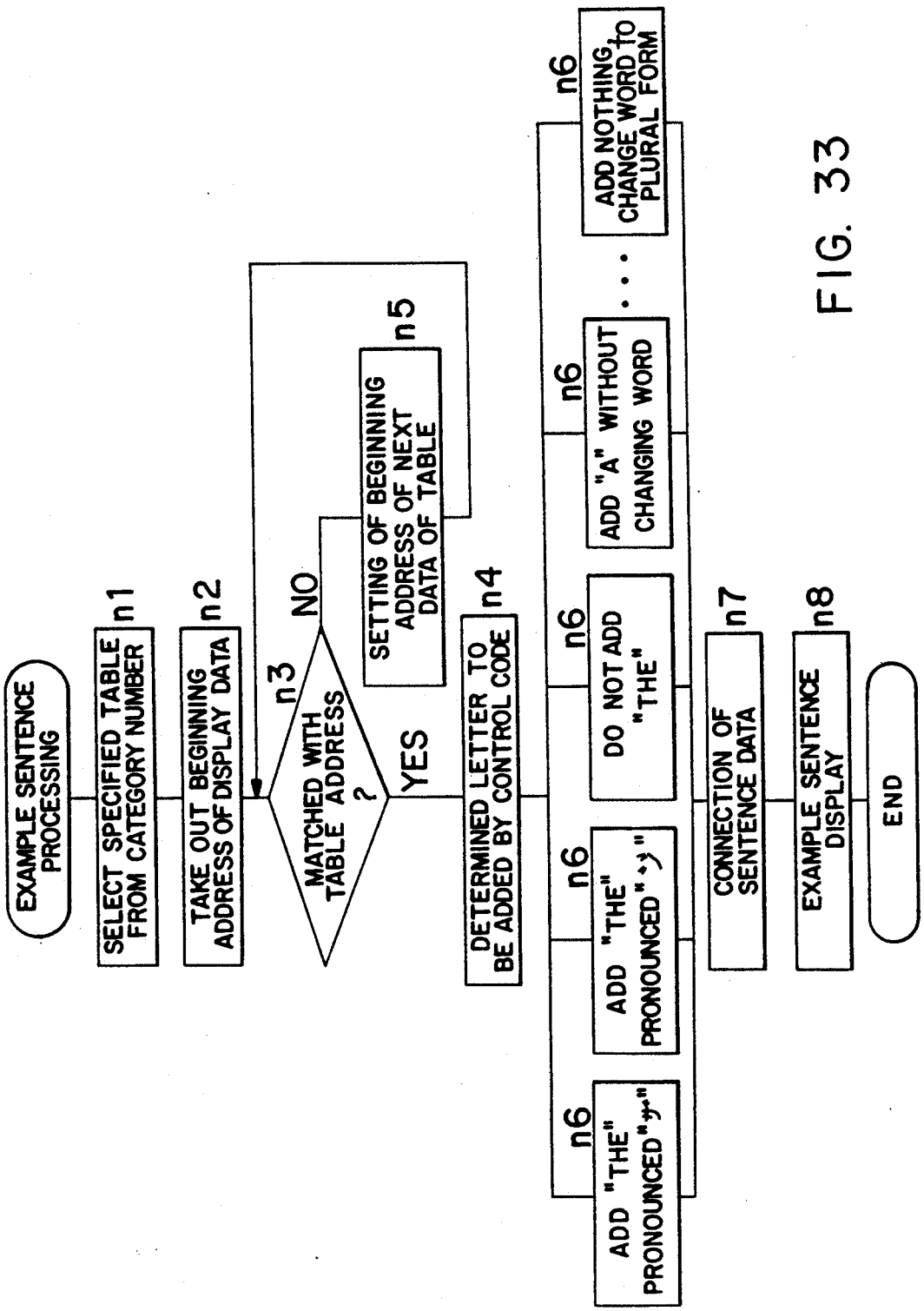
FIG. 33 is a flow chart showing the operation of example sentence processing.

FIG. 33 is a flow chart showing the operation of the example sentence processing in this embodiment.

In this operation, first of all, the table shown in FIG. 32 specified by the category key is selected at step n1. Next, at step n2, the beginning address of the word data to be displayed is read out. At step n3, the beginning address of the first data of the selected table is compared with the beginning address read out, and if not coinciding, the operation advances to step n5, and the beginning address of the next data is set, and if matching, the operation goes to step n4, and the control code corresponding to the beginning address is read out, and the next action determined by that control code is executed. At step n6, the action corresponding to the control code is carried out, that is, the definite article "the" or the indefinite article "a" or "an" is added and its pronunciation is specified, or the word data is set in plural form. At next step n7, the remaining sentence data is connected, and the example sentence is displayed at step n8.

Thus, the English word is displayed by adding a necessary article or in a plural form, so that an adequate sentence can be expressed.

The present invention may be embodied in other specific forms without departing from the spirit or essential characteristics thereof. The present embodiments are therefore to be considered in all respects as illustrative and not restrictive, the scope of the present invention being indicated by the appended claims rather than by the foregoing description and all changes which come within the meaning and the range of equivalency of the claims are therefore intended to be embraced therein.

What is claimed is:

1. An electronic translator apparatus for reading out title data belonging to a specified category and for translating the title data in other language by an operation of a translation key, comprising:
   a language memory for storing title data and explanatory data relating to the title data;
   first means for reading out desired title data by category key operation and for reading out the explanatory data relating to the title data from said language memory in response to a specific key operation; and
   second means for translating the title data and the explanatory data into an other language in response to an operation of a translation key.

* * * * *